(12) United States Patent
Rahmani et al.

(10) Patent No.: US 11,934,801 B2
(45) Date of Patent: Mar. 19, 2024

(54) MULTI-MODAL PROGRAM INFERENCE

(71) Applicant: Microsoft Technology Licensing, LLC, Redmond, WA (US)

(72) Inventors: Kiarash Rahmani, West Lafayette, IN (US); Mohammad Raza, Redmond, WA (US); Sumit Gulwani, Sammamish, WA (US); Vu Minh Le, Redmond, WA (US); Daniel James Morris, Seattle, WA (US); Arjun Radhakrishna, Seattle, WA (US); Gustavo Araujo Soares, Seattle, WA (US); Ashish Tiwari, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 121 days.

(21) Appl. No.: 17/544,502

(22) Filed: Dec. 7, 2021

(65) Prior Publication Data
US 2023/0176829 A1 Jun. 8, 2023

(51) Int. Cl.
*G06F 40/30* (2020.01)
*G06F 8/10* (2018.01)
(Continued)

(52) U.S. Cl.
CPC .............. *G06F 8/33* (2013.01); *G06F 8/10* (2013.01); *G06F 8/30* (2013.01); *G06F 8/38* (2013.01); *G06F 40/30* (2020.01); *G06F 40/40* (2020.01)

(58) Field of Classification Search
None
See application file for complete search history.

(56) References Cited

U.S. PATENT DOCUMENTS 5,117,497 A * 5/1992 Kanamori ................. G06F 8/33
 717/112
8,898,159 B2 11/2014 Brown et al.
(Continued)

OTHER PUBLICATIONS

"GPT-3 Powers the Next Generation of Apps", Retrieved from: https://openai.com/blog/gpt-3-apps/, Mar. 25, 2021, 10 Pages.
(Continued)

*Primary Examiner* — Jason D Mitchell
(74) *Attorney, Agent, or Firm* — Ogilvie Law Firm

(57) ABSTRACT

Embodiments use a multi-modal approach to generate software programs that match a solution program description. The solution program description may include natural language, input-output examples, partial source code, desired operators, or other hints. Some embodiments use optimized prompts to a pre-trained language model to obtain initial candidate programs. Maximal program components are extracted and then recombined variously using component-based synthesis. Beam search reduces a solution program search space by discarding some candidates from a given synthesis iteration. Relevance metrics, string similarity metrics, operator frequency distributions, token rareness scores, and other optimizations may be employed. By virtue of optimizations and the multi-modal approach, a solution program may be obtained after fewer iterations than by use of a language model alone. The multi-modal approach is domain agnostic, as illustrated by examples using regular expression and cascading style sheet selector domain specific languages.

20 Claims, 20 Drawing Sheets

(51) Int. Cl.
G06F 8/30 (2018.01)
G06F 8/33 (2018.01)
G06F 8/38 (2018.01)
G06F 40/40 (2020.01)

(56) References Cited

U.S. PATENT DOCUMENTS

| | | | |
|---|---|---|---|
| 10,423,733 B1* | 9/2019 | Venkataramani | G06F 30/30 |
| 10,795,645 B2 | 10/2020 | Mohamed et al. | |
| 11,633,860 B2* | 4/2023 | Lázaro-Gredilla | G06F 17/18 706/12 |
| 2016/0147736 A1* | 5/2016 | Danielyan | G06V 30/414 704/9 |
| 2019/0034785 A1* | 1/2019 | Murray | G06N 3/084 |
| 2019/0042210 A1* | 2/2019 | Gaunt | G06N 20/00 |
| 2019/0197161 A1* | 6/2019 | Rajan | G06F 16/24542 |
| 2019/0212989 A1* | 7/2019 | Polozov | G06F 8/35 |
| 2019/0324744 A1* | 10/2019 | Alam | G06F 8/31 |
| 2020/0004831 A1* | 1/2020 | Burceanu | G06F 40/146 |
| 2020/0027015 A1 | 1/2020 | Yao et al. | |
| 2020/0175304 A1* | 6/2020 | Vig | G06F 16/24522 |
| 2021/0019125 A1 | 1/2021 | Shi et al. | |
| 2021/0248492 A1 | 8/2021 | Odena et al. | |
| 2022/0147553 A1* | 5/2022 | Kumar Singh | G06F 16/328 |
| 2022/0365910 A1* | 11/2022 | He | G06F 16/211 |
| 2023/0046961 A1* | 2/2023 | Kurabayashi | G06F 8/425 |
| 2023/0089227 A1* | 3/2023 | Kurabayashi | G06F 40/30 717/106 |
| 2023/0107200 A1* | 4/2023 | Kurabayashi | G06N 3/12 717/107 |
| 2023/0140981 A1* | 5/2023 | Pouran Ben Veyseh | G06F 40/40 704/9 |

OTHER PUBLICATIONS

Alur, et al., "Scaling Enumerative Program Synthesis via Divide and Conquer", In International Conference on Tools and Algorithms for the Construction and Analysis of Systems, Mar. 31, 2017, pp. 319-336.

Alur, et al., "Syntax-Guided Synthesis", In Formal Methods in Computer-Aided Design, Oct. 20, 2013, 8 Pages.

Alur, et al., "Synthesis through Unification", In Proceedings of 27th International Conference on Computer Aided Verification, Jul. 18, 2015, pp. 163-179.

Angluin, Dana, "Learning Regular Sets from Queries and Counterexamples", In Journal of Information and Computation, vol. 75, Issue 2, Nov. 1987, pp. 87-106.

Angluin, Dana, "On the Complexity of Minimum Inference of Regular Sets", In Journal of Information and Control, vol. 39, Issue 3, Dec. 1, 1978, pp. 337-350.

Balog, et al., "DeepCoder: Learning to Write Programs", In Proceedings of International Conference on Learning Representations, Mar. 2017, 21 Pages.

Black, Paul E., "Dictionary of Algorithms and Data Structures", Retrieved from: http://vlsicad.eecs.umich.edu/BK/Slots/cache/www.nist.gov/dads/, Sep. 4, 1998, 4 Pages.

Brown, et al., "Language Models are Few-Shot Learners", In Proceedings of 34th Conference on Neural Information Processing Systems, Dec. 6, 2020, 25 Pages.

Chen, et al., "Maximal Multi-layer Specification Synthesis", In Proceedings of the 27th ACM Joint Meeting on European Software Engineering Conference and Symposium on the Foundations of Software Engineering, Aug. 26, 2019, pp. 602-612.

Chen, et al., "Multi-Modal Synthesis of Regular Expressions", In Proceedings of the 41st ACM SIGPLAN Conference on Programming Language Design and Implementation, Jun. 15, 2020, pp. 487-502.

Desai, et al., "Program Synthesis using Natural Language", In Proceedings of the 38th International Conference on Software Engineering, May 14, 2016, pp. 345-356.

Devlin, et al., "BERT: Pre-training of Deep Bidirectional Transformers for Language Understanding", In Proceedings of the Conference of the North American Chapter of the Association for Computational Linguistics: Human Language Technologies, vol. 1 (Long and Short Papers), Jun. 2, 2019, pp. 4171-4186.

Drachsler-Cohen, et al., "Synthesis with Abstract Examples", In Proceedings of International Conference on Computer Aided Verification, Jul. 24, 2017, pp. 254-278.

Feng, et al., "Component-based Synthesis for Complex APIs", In Proceedings of the 44th ACM SIGPLAN Symposium on Principles of Programming Languages, Jan. 1, 2017, pp. 599-612.

Feng, et al., "Component-based Synthesis of Table Consolidation and Transformation Tasks from Examples", In Proceedings of the 38th ACM SIGPLAN Conference on Programming Language Design and Implementation, Jun. 18, 2017, pp. 422-436.

Gulwani, Sumit, "Automating String Processing in Spreadsheets using Input-Output Examples", In Proceedings of the 38th Annual ACM SIGPLAN-SIGACT Symposium on Principles of Programming Languages, Jan. 26, 2011, pp. 317-329.

Gulwani, et al., "NLyze: Interactive Programming by Natural Language for SpreadSheet Data Analysis and Manipulation", In Proceedings of the ACM SIGMOD International Conference on Management of Data, Jun. 22, 2014, pp. 803-814.

Gulwani, et al., "Synthesis of Loop-Free Programs", In Proceedings of the 32nd ACM SIGPLAN Conference on Programming Language Design and Implementation, Jun. 4, 2011, pp. 62-73.

Huang, et al., "Natural Language to Structured Query Generation via Meta-Learning", In Proceedings of the Conference of the North American Chapter of the Association for Computational Linguistics: Human Language Technologies, vol. 2 (Short Papers), Jun. 1, 2018, pp. 732-738.

Huang, et al., "Reconciling Enumerative and Deductive Program Synthesis", In Proceedings of the 41st ACM SIGPLAN Conference on Programming Language Design and Implementation, Jun. 15, 2020, pp. 1159-1174.

Jha, et al., "Oracle-Guided Component-Based Program Synthesis", In Proceedings of International Conference on Software Engineering, vol. 1, May 2, 2010, pp. 215-224.

Jones, Karens. , "A Statistical Interpretation Of Term Specificity And Its Application In Retrieval", In Journal of Documentation, vol. 28, Issue 1, Jan. 1, 1972, 9 Pages.

Kushman, et al., "Using Semantic Unification to Generate Regular Expressions from Natural Language", In Proceedings of the Conference of the North American Chapter of the Association for Computational Linguistics: Human Language Technologies, Jun. 9, 2013, pp. 826-836.

Le, et al., "SmartSynth: Synthesizing Smartphone Automation Scripts from Natural Language", In Proceedings of the 11th Annual International Conference on Mobile Systems, Applications, and Services, Jun. 25, 2013, pp. 193-205.

Lee, et al., "Synthesizing Regular Expressions from Examples for Introductory Automata Assignments", In Proceedings of the ACM SIGPLAN International Conference on Generative Programming: Concepts and Experiences, Oct. 31, 2016, pp. 70-80.

Lin, et al. "NL2Bash: A Corpus and Semantic Parser for Natural Language Interface to the Linux Operating System", In Proceedings of the Eleventh International Conference on Language Resources and Evaluation (LREC 2018), May 7, 2018, pp. 3107-3118.

Liu, et al., "Boosting Component-based Synthesis with Control Structure Recommendation", In Proceedings of the 1st ACM International Workshop on Representation Learning for Software Engineering and Program Languages, Nov. 13, 2020, pp. 19-28.

Locascio, et al., "Neural Generation of Regular Expressions from Natural Language with Minimal Domain Knowledge", In Proceedings of 2016 Conference on Empirical Methods in Natural Language Processing, Nov. 1, 2016, pp. 1918-1923.

Manshadi, et al., "Integrating Programming by Example and Natural Language Programming", In Proceedings of Twenty-Seventh AAAI Conference on Artificial Intelligence, Jul. 14, 2013, pp. 661-667.

Pan, et al., "Automatic Repair of Regular Expressions", In Proceedings of the ACM on Programming Languages, vol. 3, No. OOPSLA, Article 139, Oct. 10, 2019, 29 Pages.

(56) References Cited

OTHER PUBLICATIONS

Polikarpova, et al., "Program Synthesis from Polymorphic Refinement Types", In Journal of ACM SIGPLAN Notices, vol. 51, Issue 6, Jun. 13, 2016, pp. 522-538.

Raza, et al., "Automated Data Extraction Using Predictive Program Synthesis", In Proceedings of the Thirty-First AAAI Conference on Artificial Intelligence, Feb. 12, 2017, pp. 882-890.

Raza, et al., "Compositional Program Synthesis from Natural Language and Examples", In Proceedings of Twenty-Fourth International Joint Conference on Artificial Intelligence, Jul. 25, 2015, pp. 792-800.

Raza, et al., "Web Data Extraction Using Hybrid Program Synthesis: A Combination of Top-down and Bottom-up Inference", In Proceedings of the ACM SIGMOD International Conference on Management of Data, Jun. 14, 2020, pp. 1967-1978.

Rivoal, et al., "CSS Snapshot 2020", Retrieved from: https://www.w3.org/TR/CSS/, Dec. 22, 2020, 73 Pages.

Solar-Lezama, Armando, "Program Synthesis by Sketching", In Dissertation of University of California, 2008, 214 Pages.

Srivastava, et al., "From Program Verification to Program Synthesis", In Proceedings of the 37th Annual ACM SIGPLAN-SIGACT Symposium on Principles of Programming Languages, Jan. 17, 2010, pp. 313-326.

Wang, et al., "Program Synthesis using Abstraction Refinement", In Proceedings of the ACM on Programming Languages, vol. 2, Issue POPL, Article 63, Jan. 2018, 30 Pages.

Wang, et al., "RAT-SQL: Relation-Aware Schema Encoding and Linking for Text-to-SQL Parsers", In Proceedings of the 58th Annual Meeting of the Association for Computational Linguistics, Jul. 5, 2020, pp. 7567-7578.

Yaghmazadeh, et al., "SQLizer: Query Synthesis from Natural Language", In Proceedings of the ACM on Programming Languages, vol. 1, Issue OOPSLA, Article 63, Oct. 12, 2017, 26 Pages.

Zhong, et al., "SemRegex: A Semantics-Based Approach for Generating Regular Expressions from Natural Language Specifications", In Proceedings of the Conference on Empirical Methods in Natural Language Processing, Oct. 31, 2018, pp. 1608-1618.

"Regular Expression in ASP.NET for Decimal Validation", Retrieved From: https://stackoverflow.com/questions/19746891/regular-expression-in-asp-net-for-decimal-validation, Nov. 2, 2013, 2 Pages.

Rahmani, et al., "Multi-modal Program Inference: A Marriage of Pre-trained Language Models and Component-Based Synthesis", In Proceedings of the ACM on Programming Languages, vol. 5, Issue OOPSLA, Article 158, Oct. 15, 2021, 29 Pages.

\* cited by examiner

SOME ASPECTS OF SOME ENHANCED SYSTEMS 202

| CASCADING STYLE SHEET 402 SELECTOR 404 | DOMAIN AGNOSTIC 406 |

PROMPT 408: DOMAIN 410 DESCRIPTION 412,
SAMPLE QUESTION-ANSWER PAIR 414, NON-PAIRED QUESTION 416

| RELEVANCE 418 METRIC 420 | BEAM SEARCH 422 RESULT 424 |
| DATA SCIENCE DATA PROCESSING SCRIPT 426 | ITERATION 428 |

MAXIMAL COMPONENT 430 FREQUENCY 432, SIZE 434, VALIDITY 436

| REGULAR EXPRESSION 438 | OPERATOR 440 FREQUENCY DISTRIBUTION 442 |

PROGRAM OCCURRENCE / REDUNDANCY 444 / 446 PROBABILITY 448 / 450

| STRING 452 SIMILARITY 454 | CLOSED PROGRAM 218, 456 |
| TOKEN 458 RARENESS 460 SCORE 462 | SKETCH 464: TEMPLATE 466 |

Fig. 4

EXAMPLE METHOD 500: MULTI-MODAL PROGRAM INFERENCE 502

START

RECEIVE 504 SOLUTION PROGRAM DESCRIPTION

OBTAIN 506 PROGRAMS; INFER 508 COMPONENTS

ITERATIVELY CONSTRUCT 510 CANDIDATES BY SYNTHESIS 512

RANK 514 CANDIDATES; DESIGNATE 516 SOLUTION

LEVERAGE 518 SOLUTION, E.G., BY EXECUTING 520 IT,
RECOMMENDING 522 IT, OR LISTING 524 IT

FINISH

Fig. 5

| # | Natural Language | Ground Truth | Pre-trained Model's Candidates |
|---|---|---|---|
| I | A line with a "!", a capital, or a lower-case before a character | (!\|[A-Z])\|[a-z].*.* | (!\|([a-z])\|([A-Z]))<br>[A-Z]\|[a-z]\|[a-z]?<br>(!\|[a-z]\|[A-Z]\|[a-z]).*<br>([a-z]\|[A-Z]).*.<br>([A-Z], *.\|[a-z]).*.*<br>([A-Z], *.\|[a-z]).*.(.\|.\|.).*<br>!\|[a-z]\|[A-Z]<br>(.\|[A-Z]).\|[a-z]<br>(.\|[A-Z]).\|[a-z] |
| II | Lines with at least 7 of the string "!" or a vowel | (!\|[aAeEiIoOuU]){7,} | (!\|?)\|[aAeEiIoOuU]+.*<br>(!+.*\|[aAeEiIoOuU])(7)<br>(.*[aAeEiIoOuU]\|vowel)(7)<br>((!))+\|[aAeEiIoOuU])+ | ((+)\|[aAeEiIoOuU])+<br>(*!)(7,)\|(.*\|[aAeEiIoOuU])+<br>((!+)\|..........)+<br>(((!,?))*\|[aAeEiIoOuU])+ |
| III | At least one digit followed by character ; at most once followed by a digit at least zero times | [0-9]+;?[0-9]* | (0-9]*..;((0-9]*)?)+<br>[0-9]+;?[0-9]?<br>[0-9]?;[0-9]?*<br>[0-9]{1,}(;.[0-9]{0,})* | (0-9]*;((\|[0-9])*(0[0-9])+<br>[0-9]{3}<br>[0-9]*...*[0-9]*0*<br>[0-9]{3}+ |

Fig. 7

Examples of three tasks with natural language descriptions of regular expressions, the intended ground truth program, and a sample of the pre-trained model's top-ranked candidates for the task A DSL is defined as a tuple $\mathcal{L} := \langle \text{Sort}, \text{Const}, \text{Oper}, s^\circ, \psi_{arg}, \psi_{ret} \rangle$ where Sort is a set of *sorts*, Const is a set of *constants*, Oper is a set of *operators*, and $\psi_{arg}, \psi_{ret} : \text{Oper} \to \overline{\text{Sort}}$ and $\psi_{ret} : (\text{Oper} \cup \text{Const}) \to \text{Sort}$ are a pair of *signature functions*. The signature function $\psi_{arg}$ maps a given operator to an ordered sequence of sorts – *of its arguments* – and the signature function $\psi_{ret}$ maps a given operator or a constant to a single sort – *of its return value*. A DSL can be used to build *terms* as follows: every constant is a term, and if $t_1, \ldots, t_n$ are terms of sorts $s_1, \ldots, s_n$ respectively, then $op(t_1, \ldots, t_n)$ is a term of sort $\psi_{ret}(op)$ if $\psi_{arg}(op) = \langle s_1, \ldots, s_n \rangle$. We do not distinguish between a DSL and the set of terms it generates, and hence, $\mathcal{L}$ will also denote the set of all terms in the language. Each DSL also contains a special sort $s^\circ$ and the goal of the synthesis algorithm is to return a term of this sort. Terms of sort $s^\circ$ will be called *closed terms* or *complete programs*.

Fig. 8

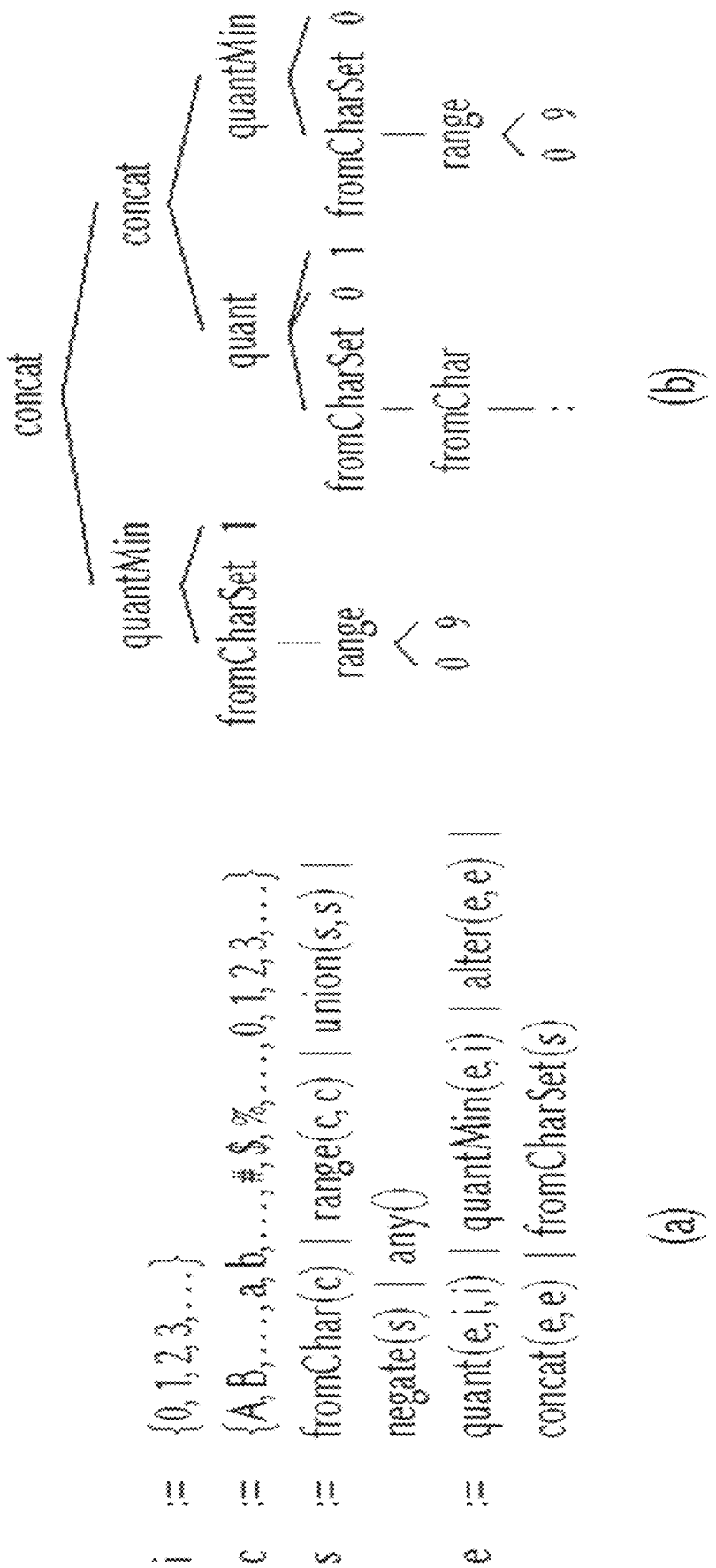
Fig. 9 The DSL $\mathcal{L}_{REG}$ of regular expressions (left) and the parsed tree of $[0-9]+?:?[0-9]*$ (right)

Definition (*sub-term and atomic terms*). A reflexive and transitive sub-term (or sub-component) relation, denoted by $\sqsubseteq: \mathcal{L} \times \mathcal{L}$, holds between terms $t$ and $t'$, denoted by $t \sqsubseteq t'$, if it appears as an argument in the syntax tree of $t'$. We say that a term $t$ is *atomic* if there does not exist any other term $t'$ such that $t' \neq t$ and $t' \sqsubseteq t$.

Fig. 10

We now formulate a general notion of semantics for terms. We assume that there is an input domain $\Delta_{in}$ and an output domain $\Delta_{out}$ for each sort, and the semantics of a DSL is specified by a function $[\![.]\!] : \mathcal{L} \to (\Delta_{in} \to \Delta_{out})$ that given a term in $\mathcal{L}$ returns a function from the input domain to the output domain. Under these assumptions, terms can be viewed as *programs* which transform an input from $\Delta_{in}$ to an output in $\Delta_{out}$. We may also refer to any sub-term of a complete program as a *component* of that program.

For instance, the semantics of closed terms in the DSL of regular expressions is defined over the input domain $\Delta_{in}$ that contains all finite strings and the output domain $\Delta_{out} := \{\bot, \top\}$. A string $str$ is said to be *accepted* by the expression $r$ if and only if $[\![r]\!](str) = \top$. We adopt this semantics from the standard regular expression implementations. Informally, a term of sort $s$ accepts strings containing a single character $c$ if and only if $c$ satisfies constraints imposed by the root operator of that term. In particular, fromChar($c_1$) only accepts the character $c_1$, range($c_1, c_2$) accepts any character that lies between $c_1$ and $c_2$, union($s_1, s_2$) accepts characters that are accepted by either $s_1$ or $s_2$ and negate($s$) accepts characters which are *not* accepted by $s$. The 0-ary operator any() accepts all characters.

Fig. 11

$s$ ::= "a string literal"
$i$ ::= a number literal | MultipleOffset($i, i$)
$n$ ::= Any() | Union($n, n$) | Not($n, n$) | TagEquals($n, n$) | nthChild($n, i$)
  | AttributeEquals($n, s, s$) | nthLastChild($n, i$) | AttributeContains($n, s, s$) | RightSibling($n, n$)
  | AttributeStartsWith($n, s, s$) | Children($n, n$) | AttributeEndsWith($n, s, s$) | Descendants($n, n$)

The DSL $\mathcal{L}_{CSS}$ of CSS expressions.

Fig. 12

| | | |
|---|---|---|
| [[ $i$ ]] | = | $\{i\}$ for all number literals $i$ |
| [[ MultipleOffset($i, j$) ]] | = | $\{j, i+j, 2i+j, 3i+j, \ldots\}$ |
| [[ $s$ ]] | = | $s$ for all string literals $s$ |
| [[ Any() ]] | = | the set of all nodes in the input document |
| [[ Union($n_1, n_2$) ]] | = | [[ $n_1$ ]] $\cup$ [[ $n_2$ ]] |
| [[ Not($n_1, n_2$) ]] | = | [[ $n_1$ ]] $-$ [[ $n_2$ ]] where $-$ denotes set difference |
| [[ TagEquals($n, s$) ]] | = | $\{$node $\in$ [[ $n$ ]] $\mid$ the tag of node is "$s$"$\}$ |
| [[ nthChild($n, i$) ]] | = | $\{$node $\in$ [[ $n$ ]] $\mid$ node is the $k$-th child of its parent for some $k$ in [[ $i$ ]]$\}$ |
| [[ nthLastChild($n, i$) ]] | = | $\{$node $\in$ [[ $n$ ]] $\mid$ node is the $k$-th child for $k \in$ [[ $i$ ]], counting from the end, of its parent$\}$ |
| [[ AttributeEquals($n, s_1, s_2$) ]] | = | $\{$node $\in$ [[ $n$ ]] $\mid$ node has an attribute $s_1$ that is set to $s_2\}$ |
| [[ AttributeContains($n, s_1, s_2$) ]] | = | $\{$node $\in$ [[ $n$ ]] $\mid$ node has an attribute $s_1$ whose value contains $s_2$ as a substring$\}$ |
| [[ AttributeStartsWith($n, s_1, s_2$) ]] | = | $\{$node $\in$ [[ $n$ ]] $\mid$ node has an attribute $s_1$ whose value starts with $s_2\}$ |
| [[ AttributeEndsWith($n, s_1, s_2$) ]] | = | $\{$node $\in$ [[ $n$ ]] $\mid$ node has an attribute $s_1$ whose value ends with $s_2\}$ |
| [[ RightSibling($n_1, n_2$) ]] | = | $\{$node $\in$ [[ $n_2$ ]] $\mid$ node is preceded by some node in [[ $n_1$ ]] with the same parent$\}$ |
| [[ Children($n_1, n_2$) ]] | = | $\{$node $\in$ [[ $n_2$ ]] $\mid$ node is the child of some node in [[ $n_1$ ]]$\}$ |
| [[ Descendants($n_1, n_2$) ]] | = | $\{$node $\in$ [[ $n_2$ ]] $\mid$ node is the descendant of some node in [[ $n_1$ ]]$\}$ |

The semantics of CSS expressions DSL

Fig. 13

Given a DSL $\mathcal{L} := \langle Sort, Const, Oper, s^\circ, \mathcal{V}_{arg}, \mathcal{V}_{ret} \rangle$, we define a multi-modal synthesis task as a tuple $(N, E)$, where $N$ is the natural language description of the task and $E$ is a set of *examples*. We define an example $e \in \Delta_{in} \times \Delta_{out}$ as a pair of values from the input and the output domains. The synthesizer's goal is to find a program $p \in \mathcal{L}$ that is consistent with the given examples, defined as follows:

$$p \models E \iff \forall_{\langle i,o \rangle \in E} [[p]](i) = o$$

Fig. 14

1: SYNTHESIZE$_{\mathcal{L},\mathcal{M}}$ $(N, E) :=$
2:     let $\mathcal{L} = (\text{Sort}, \text{Const}, \text{Oper}, s^\circ, \psi_{arg}, \psi_{ret})$
3:     $P := \text{exec}(\mathcal{M}, N)$
4:     $\mathbb{C} := \text{INITIALIZE}(P)$
5:     foreach $i$ in $\{1, 2, \ldots, \text{SynthDepth}\}$:
6:        $\mathbb{C} := \text{EXPAND}(\mathbb{C}, P, E)$
7:     $v_1 := \{t \mid t \in \mathbb{C}(s^\circ) \wedge t \models E\}$
8:     return $\text{RANK}(v_1, P).\text{top}(1)$ (a) main function 1: INITIALIZE $(P) :=$
2:     $v_1 := \{t \mid t \sqsubseteq p \wedge p \in P\}$
3:     $v_2 := \{t \mid t \in v_1 \wedge \text{cnt}(t, P)/|P| \geq \text{PrOcc}\}$
4:     $v_3 := \emptyset$
5:     foreach $t$ in $v_2$
6:        $s := \{t' \mid t' \in v_1 \wedge t \sqsubseteq t'\}$
7:        $s_r := \{t' \in s \mid t \neq t' \wedge \text{cnt}(t, P) = \text{cnt}(t', P)\}$
8:        if $|s_r|/|s| \leq \text{PrRed}$ then
9:           $v_3 := v_3 \cup \{t\}$
10:    $v_3 := v_3 \cup \text{stdComps}(\mathcal{L})$
11:    foreach $s$ in Sort:
12:        $\mathbb{C}(s) := \{t \mid t \in v_3 \wedge \text{srt}(t) = s\}$
13:    return $\mathbb{C}$ (b) cache initialization

Fig. 15

```
1: EXPAND (ℂ, P, E) :=
2:     ℂ' := PRUNE(ℂ, P, E)
3:     foreach op in Oper :
4:         <s_1, ..., s_n> := ψ_arg(op)
5:         v_1 := {op(t_1, ..., t_n) | ∀_{1≤i≤n} t_i ∈ ℂ'(s_i)}
6:         s := ψ_ret(op)
7:         ℂ := ℂ[s ↦ ℂ(s) ∪ v_1]
8:     return ℂ
```

(c) cache expansion

```
1: PRUNE (ℂ, P, E) :=
2:     foreach s in Sort:
3:         v_1 := ℂ(s)
4:         v_2 := {t | t ∈ v_1 ∧ ∀_{t'⊏t} [[t]]_E ≠ [[t']]_E}
5:         v_3 := {t | t ∈ v_2 ∧ HAMMDIST(P, t) = 0}
6:         v_4 := {T | T ⊆ v_3 ∧ (∀_{t,t'∈T}. [[t]]_E = [[t']]_E) ∧
                                  (∀_{t∈v_3} ∃_{T'∈v_4}. t ∈ T')}
7:         f := λT. (|T|/|v_3| × BeamSize)
8:         v_5 := ⋃_{T∈v_4} {t | t ∈ ordEuc(T, P).top(f(T))}
9:         ℂ := ℂ[s ↦ v_5]
10:    return ℂ
```

(d) cache pruning

Fig. 15, continued

```
1:  RANK (T, P) :=
2:      f₁ = λt. EUCDIST(P, t)
3:      f₂ = λt. (∑_{p∈P} lev(t, m))/|P|)
4:      return T.orderBy(f₁, f₂)
```

(e) ranking candidates

```
1:  EUCDIST (P, t) :=
2:      <v₁, ..., vₙ> := opVec(t)
3:      <v'₁, ..., v'ₙ> := (∑_{p∈P} opVec(p))/|P|
4:      return √(∑_{1≤i≤n} (vᵢ - v'ᵢ)²)
```

(f) standard Euclidean distance

```
1:  HAMMDIST (P, t) :=
2:      <v₁, ..., vₙ> := opVec(t)
3:      <v'₁, ..., v'ₙ> := (∑_{p∈P} opVec(p))/|P|
4:      return |{i | vᵢ > OpTH ∧ v'ᵢ < OpTH ∧ 1 ≤ i ≤ n}|
```

(g) customized Hamming distance

Fig. 15, continued

| | |
|---|---|
| SynthDepth: | number of synthesis iterations |
| PrOcc: | minimum probability of occurrence of a component in programs in $P$ |
| PrRed: | maximum probability of redundancy of a component in programs in $P$ |
| BeamSize: | number of programs (of each sort) used to synthesize the next set |
| OpTH: | threshold that determines low-frequency operator occurrence |

(h) constants

| | |
|---|---|
| opVec($t$): | returns a vector composed of the number of occurrences of each DSL operator in $t$ |
| orderBy($f_1, f_2$): | returns a lexicographically ordered list based on given score functions $f_1$ and $f_2$ |
| lev($t_1, t_2$): | returns the Levenshtein distance between string representations of $t_1$ and $t_2$ |
| top($n$): | returns the first $n$ elements from an ordered list |
| srt($t$): | returns the sort of the root operator in $t$ |
| cnt($t, P$): | returns number of programs $p$ in $P$ such that $t \sqsubseteq p$ |
| exec($M, N$): | Runs $M$ on $N$ and returns the resulting candidate programs |
| stdComps($\mathcal{L}$): | the standard components to include for DSL $\mathcal{L}$ |
| ordEuc($T, P$): | orders terms in $T$ based on their Euclidean distance from average program in $P$ |

(i) auxiliary functions

Fig. 15, continued

```
(01) Here are some examples of regular expressions
(02) and their descriptions. Use them to generate a
(03) regular expression that matches the description.
(04)
(05) NL: lines which begin with an upper case vowel
(06) Regex: [AEIOU].*
(07)
(08) NL: match lines which contain only consonants
(09) Regex: [^AEIOUaeiou]*
(10)
(11) NL: lines ending with a digit followed by period
(12) Regex: .*[0-9][.]
(13)
(14) NL: dates in ISO 8601 format
(15) Regex: [0-9]{4}-[0-9]{2}-[0-9]{2}
(16)
(17) NL: lines starting with three upper case vowels
        followed by four digits
(18) Regex:
```

(a) prompt

```
(18) Regex: [AEIOU]{3}[0-9]{4}.*
(19)
(20) NL: lines starting with a digit followed by three
        upper case letters followed by two digits
(21) Regex: [0-9][A-Z][A-Z][A-Z][0-9]{2}
```

(b) completion

Fig. 16

| Algorithm QAPR |
|---|

Require: Question-answer corpus $QA = ((q_0, a_0), \ldots, (q_n, a_n))$
Require: Natural language description at hand $q^*$
Require: Relevance metric $\mathcal{R}$
Require: Result size threshold $k \in \mathbb{R}$ and similarity threshold $t \in \mathbb{R}$ 1: RelevantQA ← empty sequence
2: while $QA \neq \emptyset \land |\text{RelevantQA}| < k$ do
3:     $(q_m, a_m) \leftarrow \text{argmax}_{(q_i, a_i) \in QA} \mathcal{R}(q^*, q_i)$
4:     $QA \leftarrow QA \setminus \{(q_m, a_m)\}$
5:     if $\nexists (q, a) \in \text{RelevantQA}. \text{LevenshteinDistance}(a, a_m) < t$ then
6:       RelevantQA ← RelevantQA; $(q_m, a_m)$
7:     end if
8: end while
9: return RelevantQA

Fig. 17

*Relevance Metrics.* Suppose we are interested in computing $\mathcal{R}(q, q')$, the relevance of question $q$ to question $q'$. We use $|q|$ and $|q'|$ to denote the number of tokens in $q$ and $q'$, respectively, and define $CT(q,q')$ to be the set of tokens common to $q$ and $q'$. We now introduce two different definitions for $\mathcal{R}(q,q')$:

- Token match: This metric, $\mathcal{R}_{TM}$, measures the fraction of the number of tokens in $q$ that are also present in $q'$, i.e. $\mathcal{R}_{TM}(q,q') = \frac{|CT(q,q')|}{|q|}$.

The score $TFIDF(T)$ of a token $T$ is the product of (a) the *term frequency* of $T$, i.e., the number of times $T$ occurs in $q$, and (b) the log of the *inverse document frequency* of $T$, i.e., the negative log of the fraction of questions from the corpus that $T$ appears in. Thus, we have $\mathcal{R}_{TFIDF}(q,q') = \frac{\sum_{T \in CT(q,q')} TFIDF(T)}{\sum_{T \in q} TFIDF(T)}$.

Fig. 18

| # | Natural Language | Ground Truth | Pre-trained Model's Candidates |
|---|---|---|---|
| I | select just those checkboxes that have values set | input[value][type="checkbox"]:not([value=""]) | input[type="checkbox"][value]<br>[type="checkbox"][value]<br>[checked="true"]<br>input[type="checkbox"]:checked<br>[value] |
| II | something that matches "(a or b) and c" | a.c, b.c | a+b+c<br>a.b.c<br>a.b[class*="c"]<br>[class="a"][class="b"] .c<br>a.b[.c] |
| III | select the first and the last TD in a row | tr td:first-child, tr td:last-child | tr:first-child:last-child<br>td:last()<br>td:first-child:last-child<br>td:first-child, a:td:last-child<br>td:not(:first-child):not(:last-child)<br>td:nth-child(1), a:td:last-child |

Example tasks for inferring CSS selectors. For each task we show the natural language description, the desired ground truth selector, and a sample of the PTM's top-ranked programs

Fig. 19

| # | Natural Language | Ground Truth | Pre-trained Model's Candidates |
|---|---|---|---|
| I | Convert a dataframe to a dictionary, where row values of 'HP' are the keys and the other columns are the values | df.set_index('HP') .to_dict(orient='index') | pd.to_dict(df, orient='index')<br>df.to_dict(orient='index', prefix='HP')<br>df.to_dict(orient='index')<br>df.to_dict(orient='index', axis=1)<br>pd.DataFrame(df2).to_dict(orient='records')<br>df.to_dict(orient='index', axis=1) |
| II | group by 'HP' and 'Type 1' and calculate mean and count for each group | df.groupby(['HP', 'Type 1']) .agg(['mean', 'count']) | df.groupby(['HP', 'Type 1']).mean().agg([('count', 'sum')]).fillna(0)<br>df.groupby(['HP', 'Type 1']).mean()<br>df.groupby(['HP', 'Type 1']).apply(np.mean)<br>df.groupby(['HP', 'Type 1']).apply(np.count) |
| III | get list of columns grouped by datatype of column | df.columns.to_series() .groupby(df.dtypes).groups | df.groupby(['dtype'])<br>df[['name']].groupby(by='type').count()<br>Code: df.groupby(['col']).columns<br>df.groupby(column_type).columns.value_counts()<br>grouped_cols = df.groupby('Type') |

Fig. 20

Pandas Examples: The NL description of task, the associated ground truth, and the candidates generated by the PTM model. The last column only shows a few selected candidates.

MULTI-MODAL PROGRAM INFERENCE

BACKGROUND

Programs for software development were among the first software tools created, ultimately including editors, version managers, interpreters, compilers, linkers, automated testers, debuggers, and profilers, for example. Tools for hardware development, e.g., for circuit layout or optimization, also exist. Development tools have undergone many changes over time, including many improvements. Some tools accept input not only in the form of characters typed on a keyboard, but also in the form of data sent from a mouse, pen, touch pad, touch screen, microphone, or other device. Some permit a user to define a sequence of keys as a macro, allowing the user to easily repeat a command sequence. Many editors provide a WYSIWYG (what you see is what you get) user experience, so that an appearance of a document onscreen in the editor closely resembles a result of printing the document. Some tools support multiple windows, to assist a user who is working contemporaneously with multiple files or with different parts of a given file, or both. Some tools support integration of graphic images into a document, or provide a user with access to graphics tools within a tool usage session.

The range of "text" operated upon by an editor or debugger, for example, was originally limited mostly to alphabet letters, numbers, and punctuation. But over time, the text one can utilize with a development tool has expanded to include at least mathematical symbols, geometric shapes, music and other notational systems, logographic and syllabic scripts, and many other written symbols. As of the present time, the Unicode® technology standard for encoding, representing, and handling text covers over 150 modern and historic scripts, including over 140,000 characters (mark of Unicode, Inc.).

Some tools are specialized for particular knowledge areas or fields of practice, such as video editing, sound editing, automated program testing, or software source code editing or debugging. In particular, some source code tools provide integrated functionality for syntax checking, autocompletion, indentation, brace matching, and easy access to an editor, compiler, interpreter, or debugger. Despite these advancements, improvements are still possible in the field of tools for developing software or hardware.

SUMMARY

Some embodiments described herein perform a kind of multi-modal program inference which favors strengths of language models and synthesizers while also compensating for their respective weaknesses. Some embodiments use one or more optimizations to increase program inference performance, increase solution program accuracy, or improve other aspects of computer program inference functionality. For instance, natural language model prompts are optimized, initial synthesis component selection is optimized, generation of additional programs during synthesis is optimized, and applicability of program inference tools and techniques is broadened by domain agnosticism. Other aspects of multi-modal program inference functionality are also described herein.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 4 is a block diagram illustrating some additional aspects of some enhanced systems;

FIG. 5 is a flowchart illustrating steps in some multi-modal program inference methods;

FIG. 7 shows a table containing some examples from a regular expression domain;

FIG. 8 contains a definition of a Domain Specific Language (DSL);

FIG. 9 contains a regular expressions DSL in FIG. 9(a), and a parsed tree in FIG. 9(b);

FIG. 10 contains a definition of "sub-term" and a definition of "atomic";

FIG. 11 contains a definition of semantics for a Domain Specific Language (DSL);

FIG. 12 contains a Cascading Style Sheets (CSS) expressions DSL;

FIG. 13 contains a definition of semantics for the CSS expressions DSL of FIG. 12;

FIG. 14 contains a definition of a multi-modal synthesis task;

FIG. 15 contains a synthesis algorithm description, including a main function in FIG. 15(a), a cache initialization in FIG. 15(b), a cache expansion in FIG. 15(c), a cache pruning in FIG. 15(d), a ranking of candidates in FIG. 15(e), a Euclidean distance in FIG. 15(f), a Hamming distance in FIG. 15(g), constants in FIG. 15(h), and auxiliary functions in FIG. 15(i);

FIG. 16 contains an example of language model communication, including a prompt in FIG. 16(a) and a completion in in FIG. 16(b);

FIG. 17 contains a Question-Answer Pair Ranking algorithm description;

FIG. 18 contains relevance metric definitions;

FIG. 19 shows a table containing some examples from a CSS expressions domain; and FIG. 20 shows a table containing some examples from a data science library domain.

DETAILED DESCRIPTION

Operating Environments

Figure 1:
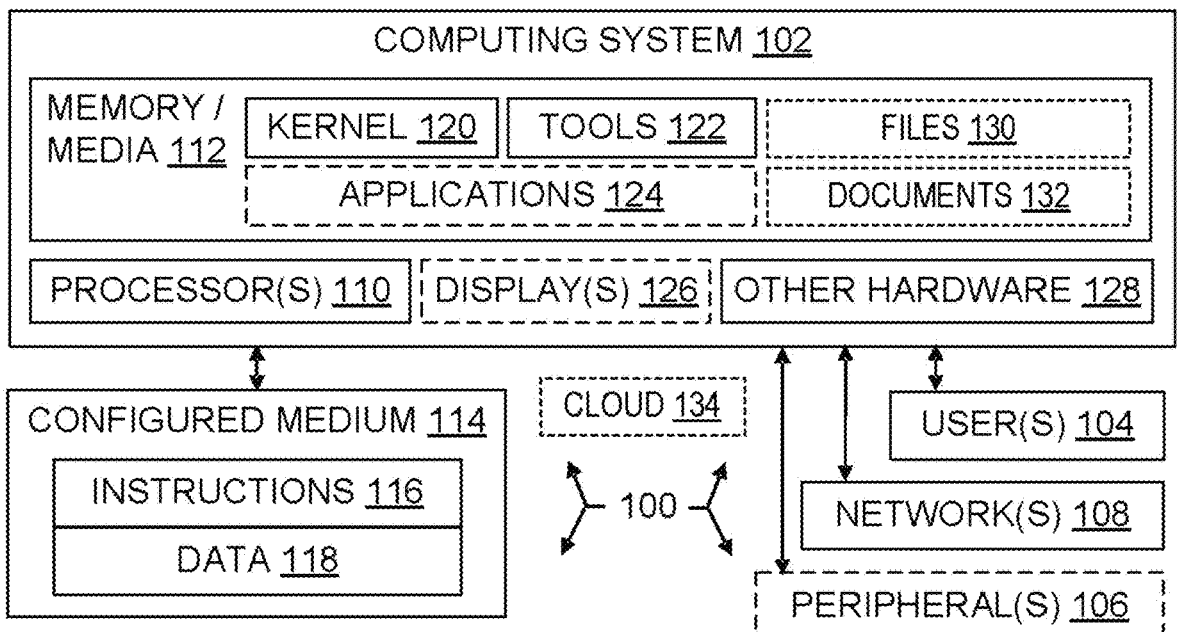
FIG. 1 is a block diagram illustrating computer systems generally and also illustrating configured storage media generally.

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 134. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112, also referred to as computer-readable storage devices 112. Documents 132 and other files 130 may reside in media 112. Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, multi-modal program inference functionality could be installed on an air gapped network and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Figure 2:
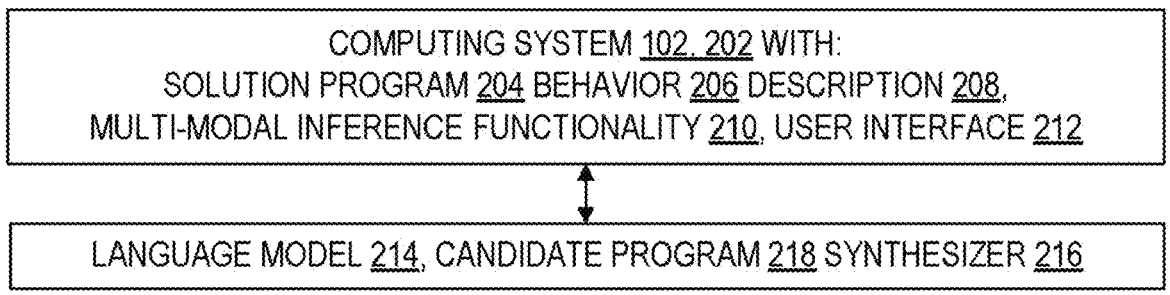
FIG. 2 is a block diagram illustrating aspects of a computing system which has one or more of the multi-modal program inference enhancements taught herein.

FIG. 2 illustrates a computing system 102 configured by one or more of the multi-modal program inference enhancements taught herein, resulting in an enhanced system 202. This enhanced system 202 may include a single machine, a local network of machines, machines in a particular building, machines used by a particular entity, machines in a particular datacenter, machines in a particular cloud, or another computing environment 100 that is suitably enhanced. Other FIG. 2 items are discussed at various points herein, and additional details regarding them are provided in the discussion of a List of Reference Numerals later in this disclosure document.

Figure 3:
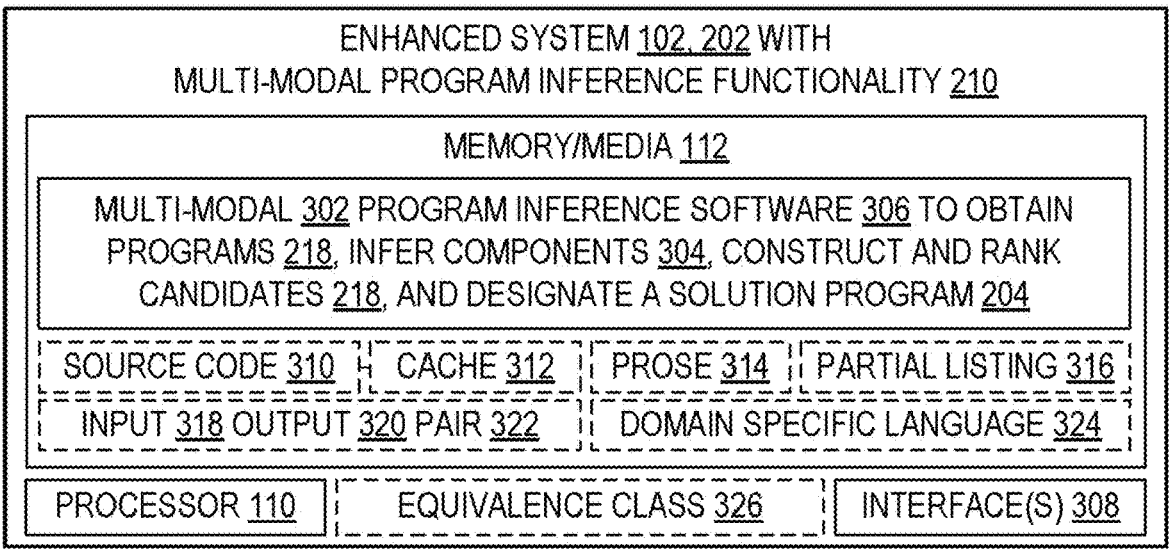
FIG. 3 is a block diagram illustrating an enhanced system configured with multi-modal program inference functionality.

FIG. 3 illustrates an enhanced system 202 which is configured with software 306 to provide multi-modal program inference functionality 210. FIG. 3 items are discussed at various points herein, and additional details regarding them are provided in the discussion of a List of Reference Numerals later in this disclosure document.

FIG. 4 shows some aspects of some enhanced systems 202. This is not a comprehensive summary of all enhanced system aspects or of every enhanced system 202. These items are discussed at various points herein, and additional details regarding them are provided in the discussion of a List of Reference Numerals later in this disclosure document.

In some embodiments, the enhanced system 202 may be networked through an interface 308. An interface 308 may include hardware such as network interface cards, software such as network stacks, APIs, or sockets, combination items such as network connections, or a combination thereof.

In some embodiments, the enhanced system 202 obtains initial components from a language model, iteratively synthesizes additional programs, ranks those synthesis results, and eventually designates one synthesized program as a solution to be presented to the user.

For example, in some embodiments the enhanced system 202, which is configured for multi-modal program inference, includes a digital memory 112, and a processor 110 in operable communication with the memory. The processor 110 is configured to perform multi-modal program inference steps. As noted elsewhere herein, digital memory 112 may be volatile or nonvolatile or a mix. The steps include (a) receiving a solution program description, (b) obtaining a set of initial candidate programs from a language model, the initial candidate programs based on at least a portion of the solution program description, (c) inferring program components from at least a portion of the initial candidate programs, (d) iteratively constructing a set of synthesized candidate programs from at least a portion of the inferred program components, the synthesized candidate programs constructed using at least program synthesis, (e) ranking at least two of the synthesized candidate programs or initial candidate programs or both relative to one another, (f) designating a top-ranked candidate program as a solution program, the solution program being consistent with the solution program description, and (g) leveraging the solution program, wherein leveraging includes at least one of: executing the solution program, recommending execution of the solution program by configuring a user interface of the computing system, or listing a source code of the solution program by configuring the user interface.

In some embodiments, the solution program description includes a natural language solution description of a desired behavior of a solution program. In some, the solution program description includes input-output examples of the desired behavior, or states which operators to use, or contains other data which can help determine the correct program, such as a partial listing of a solution program. In some embodiments, the solution program description includes at least one of the following: a natural language description which is not in any programming language source code, an input-output pair containing an input and a desired corresponding output of an execution of the solution program, an incomplete listing of a source code of the solution program, or an identification of at least one operator for inclusion in the solution program.

Some embodiments receive a set of candidate programs from the language model, and then infer the components, e.g., by extracting them. Some analyze a frequency of occurrence of a component in different programs, and utilize the analysis results to better bias component sets towards more common and less redundant components.

Some embodiments include or utilize a synthesized programs cache 312 containing at least one of the following: one or more of the obtained program components, or one or more of the constructed candidate programs.

Some embodiments include or utilize semantic equivalence classes. Each semantic equivalence class contains one or more respective program components, and each program component in a given semantic equivalence class produces upon execution the same output as the other program components in that class, in response to an input 318 of an input-output pair 322 of the solution program description. Note that the output produced by the semantic class members from the input is not necessarily the same as the output 320 shown in the input-output pair. That is, all class members produce the same output Y from a given input X, but the output Y is not necessarily the output that was specified for input X by an input-output pair of the solution program description.

In some embodiments, the solution program is further characterized by containing at least one of the following: a regular expression, a cascading style sheet selector, a data science data processing script 426 (e.g., Python's data processing library Pandas), or a source code 310 of a synthesized program in a domain specific language of a program synthesizer, where the program synthesizer is in the computing system or is in operable communication with the computing system.

Other system embodiments are also described herein, either directly or derivable as system versions of described processes or configured media, duly informed by the extensive discussion herein of computing hardware.

Although specific architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different technical features, aspects, mechanisms, operational sequences, data structures, domains 410, domain specific languages 324, or other functionalities for instance, and may otherwise depart from the examples provided herein.

Processes (a.k.a. Methods)

Figure 6:
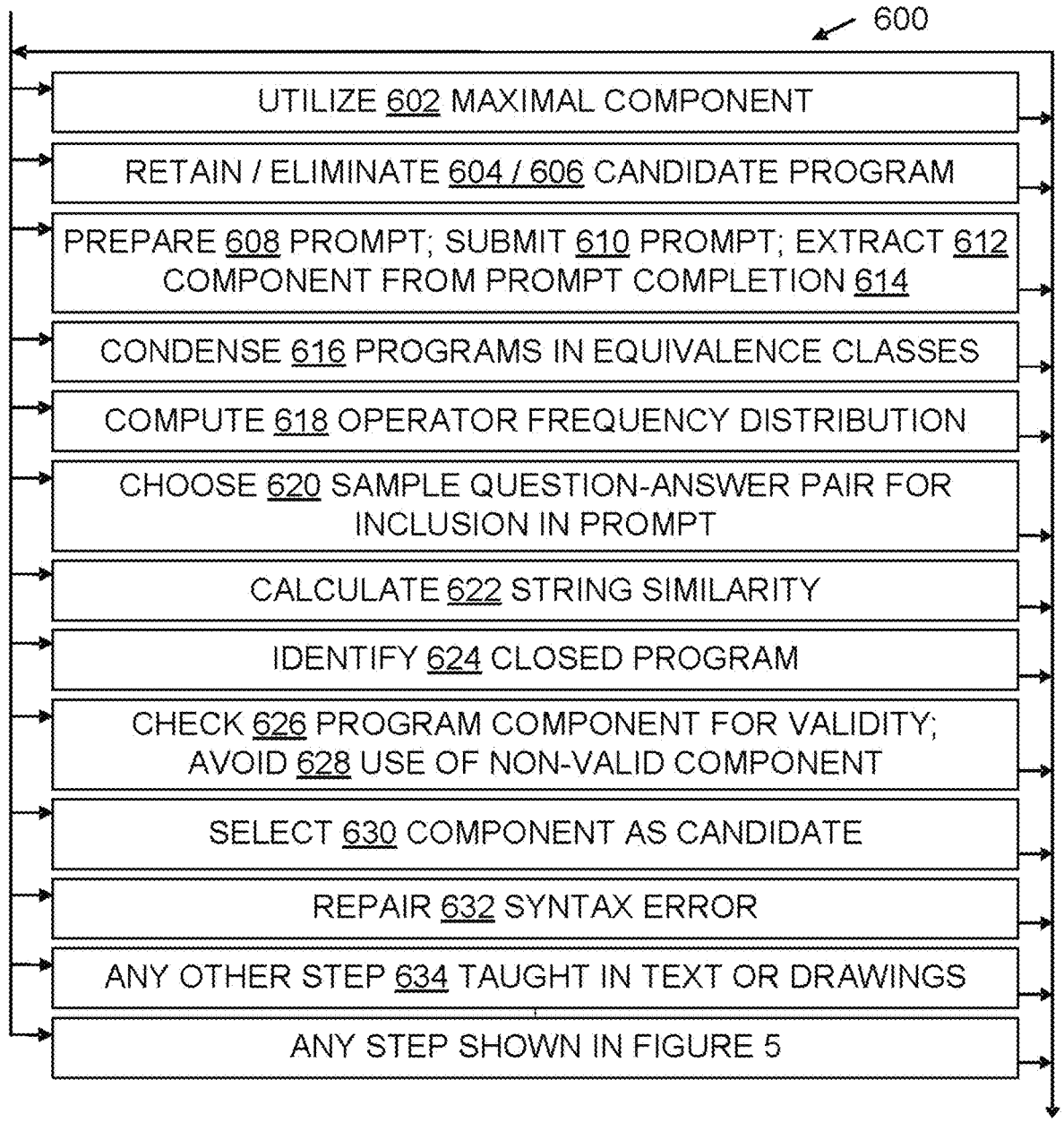
FIG. 6 is a flowchart further illustrating steps in some multi-modal program inference methods, incorporating FIG. 5.

FIGS. 5 and 6 illustrate families of methods 500, 600 (which may also be referred to as "processes" in the legal sense of that word) that may be performed or assisted by an enhanced system, such as system 202 or another multi-modal program inference functionality 210 enhanced system as taught herein. FIG. 6 includes some refinements, supplements, or contextual actions for steps shown in FIG. 5, and incorporates the steps of FIG. 5 as options.

Technical processes shown in the Figures or otherwise disclosed will be performed automatically, e.g., by an enhanced system 202, unless otherwise indicated. Related processes may also be performed in part automatically and in part manually to the extent action by a human person is implicated, e.g., in some embodiments a human may manually assemble a solution program description via typing, cut-and-paste, or voice-to-text activity, but no process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 5 and 6. Steps may be performed serially, in a partially overlapping manner, or fully in parallel. In particular, the order in which flowchart 500 or 600 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a method 600 for multi-modal program inference, the method performed by a computing system 202, the method including: receiving a solution program description; obtaining a set of initial candidate programs from a language model, the initial candidate programs based on at least a portion of the solution program description; inferring program components by extraction from at least a portion of the initial candidate programs; iteratively constructing a set of synthesized candidate programs from at least a portion of the inferred program components, the synthesized candidate programs constructed using at least program synthesis; ranking at least two of the synthesized candidate programs or initial candidate programs or both relative to one another; designating a top-ranked candidate program as a solution program, the solution program being consistent with the solution program description; and leveraging 518 the solution program, wherein leveraging includes at least one of: executing 520 the solution program, recommending 522 execution of the solution program by configuring a user interface of the computing system, or listing 524 a source code 310 of the solution program by configuring the user interface.

In some embodiments, the method is domain-agnostic in that the method is parameterized by at least a domain specific language.

In some embodiments, obtaining the set of program components from the language model includes preparing a prompt, submitting the prompt to the language model, and extracting a program component from a prompt completion provided by the language model responsive to the prompt. In some, the prompt includes a domain description 412, a sample question-answer pair 414, and a question 416 that is not paired in the prompt with any answer.

Some embodiments include utilizing a maximal component as an initial program component while iteratively constructing the set of candidate programs. The maximal component has a higher frequency of occurrence in the obtained set of program components than at least one other component in the obtained set. The maximal component also has a larger size than at least one other component in the obtained set.

In some embodiments, iteratively constructing the set of candidate programs includes either retaining or eliminating a given candidate program based on at least a beam search result.

In some embodiments, iteratively constructing the set of candidate programs includes condensing programs by using semantic equivalence classes.

In some embodiments, at least one of the following occurs: iteratively constructing the set of candidate programs includes either retaining or eliminating a given candidate program based on at least an operator frequency distribution, or ranking candidate programs includes computing 618 an operator 440 frequency distribution 442.

In some embodiments, ranking candidate programs includes calculating a string similarity between a candidate program and a program component obtained from the language model.

Some embodiments include identifying 624 a closed program 456 as a candidate program, wherein the closed program is a program which has a type or a sort that is a start symbol of a domain specific language grammar. In some embodiments and some situations, a closed program may be used as part of an even larger program in future synthesis iterations. Sone embodiments start with components, build programs during iterations, and may add more and more programs, as opposed to changing a previous iteration's programs.

Some embodiments include selecting 630 a program component for use as a candidate program based on at least one of the following: a probability of occurrence of the program component, or a probability of redundancy of the program component.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as prompts 408, language model 214 interfaces 308, synthesizer 216 interfaces 308, candidate programs 218, program components 304, a cache 312, a domain specific language 324 structure 118, multi-modal program inference software 306, and beam search results 424, in the form of data 118 and instructions 116, read from a removable storage medium 114 and/or another source such as a network connection, to form a configured storage medium. The configured storage medium 112 is capable of causing a computer system 102 to perform technical process steps for multi-modal program inference, as disclosed herein. The Figures thus help illustrate configured storage media embodiments and process (a.k.a. method) embodiments, as well as system and process embodiments. In particular, any of the process steps illustrated in FIG. 5 or 6, or otherwise taught herein, may be used to help configure a storage medium to form a configured storage medium embodiment.

Some embodiments use or provide a computer-readable storage device 112, 114 configured with data 118 and instructions 116 which upon execution by at least one processor 110 cause a computing system to perform a method for multi-modal program inference. This method includes: receiving a solution program description; obtaining a set of initial candidate programs from a language model, the initial candidate programs based on at least a portion of the solution program description; inferring program components by extraction from at least a portion of the initial candidate programs; iteratively constructing a set of synthesized candidate programs from at least a portion of the inferred program components, the synthesized candidate programs constructed using at least program synthesis; ranking at least two of the synthesized candidate programs or initial candidate programs or both relative to one another; designating a top-ranked candidate program as a solution program, the solution program being consistent with the solution program description; and leveraging the solution program, wherein leveraging includes at least one of: executing the solution program, recommending execution of the solution program by configuring a user interface of the computing system, or listing a source code of the solution program by configuring the user interface.

In some embodiments, obtaining the set of program components from the language model includes preparing 608 a prompt, submitting 610 the prompt to the language model, and extracting 612 a program component from a prompt completion 614 provided by the language model responsive to the prompt. In some, the prompt includes a sample question-answer pair. In some, the method further includes choosing 620 the sample question-answer pair for inclusion in the prompt at least in part by using a relevance metric, the relevance metric being based at least in part on a token rareness score.

In some embodiments, the method designates 516 the top-ranked candidate program as the solution program after no more than two iterations of program synthesis candidate program construction.

In some embodiments, a candidate program includes a sketch 464, the sketch being a component template 466 which matches multiple components.

In some embodiments, the method further includes at least one of the following: checking 626 an obtained program component for syntactic validity 436, or avoiding 628 use of a syntactically non-valid program component. Some embodiments utilize or take advantage of techniques such as constrained semantic decoding which improve language model performance by reducing or eliminating syntactically invalid output from a query. That is, some embodiments generate syntactically valid programs directly rather than generating programs and then repairing 632 them to fix syntax errors. Some embodiments filter out invalid model output.

Additional Observations

Additional support for the discussion of multi-modal program inference herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, additional examples and observations are offered.

Some embodiments start with a small set of seed programs, rank 514 invalid programs out during search, and then find the best solution program at the end of searching.

Some embodiments leverage characteristics of language models or characteristics of synthesizer, or both. In some views, pre-trained NL models are good at detecting the context of a task merely from the NL and gathering components (sometimes very large ones) from similar witnessed tasks in the domain, but are not good at understanding the task or understanding the output programs produced by the language model.

In some embodiments, if a partial program appears frequently in the language model output, it is favored for use in the target solution program. In some, structural information about the final solution program can be extracted from language model (e.g., GPT-3) candidates, e.g., such candidates are visually very similar to the target solution program in some situations.

Multi-modal program synthesis refers to the task of synthesizing programs (code) from their specification given in different forms, such as a combination of natural language and examples. Examples provide a precise but incomplete specification, and natural language provides an ambiguous but more complete task description. Some machine-learned pre-trained models (PTMs) are adept at handling ambiguous natural language, but struggle with generating syntactically and semantically precise code. Program synthesis techniques can generate correct code, often even from incomplete but precise specifications, such as examples, but they are unable to work with the ambiguity of natural languages.

This disclosure presents approaches that combine PTMs with component-based synthesis (CBS): PTMs are used to generate candidate programs from the natural language 314 description of the task, which are then used to guide the CBS procedure to find the program that matches the more precise examples-based specification. Some embodiments use a combination approach to instantiate multi-modal synthesis systems for two programming domains: the domain of regular expressions and the domain of CSS selectors. Embodiment evaluation demonstrates the effectiveness of a domain-agnostic approach in comparison to a specialized system, and the generality of presented approaches in providing multi-modal program synthesis from natural language and examples in different programming domains.

Some pre-trained language models (PTMs) include as Google's BERT and OpenAI's GPT-3. GPT-3 (generative pre-trained transformer) can be viewed as an intelligent conversation completion engine: given some text in a so-called prompt, the model predicts text that can follow that prompt. The predicted text tries to maintain the flow of the text in the prompt. GPT-3 facilitates a wide variety of tasks through few-shot learning. "Few-shot learning" refers to the fact that the completion predicted by the model can be tuned by providing only a few completion examples in the prompt; for present purposes, this means at most ten examples, but other contexts may specify a different limit for the "few" in "few-shot learning".

As an example using GPT-3, if the prompt contains some examples of natural language (NL) sentences being followed by the sentiment they convey, and the prompt ends with a sentence, then GPT-3 will predict the sentiment for that last sentence. It is able to do this well because it has been trained on huge amounts of data available on the web.

The question arises whether few-shot learning with PTMs can be used to go from NL descriptions to software code. For example, if one crafts the prompt to include some examples of natural language 314 descriptions followed by code 310, and then ends the prompt with a natural language description, the GPT-3 model 214 may predict code 218 that it deems to best complete the conversation presented in the prompt.

This does not mean that GPT-3 has solved the challenges of effectively and efficiently generating code from natural language descriptions. While the generality of PTMs is extremely powerful, it usually comes at the cost of limited precision. PTMs frequently fail to find exactly the right program from the given NL description, though they may sometimes output programs that are very similar to the correct one. One can also configure the PTM to return multiple programs, which it samples from some probability distribution over programs implied by the NL description, but this set also commonly does not contain the desired program due to the many possible variations.

As natural language is ambiguous and imprecise, in many cases it is not possible (even for a human) to infer the precise intent from a natural language description alone. In some multi-modal interaction paradigms, the user can provide a natural language description together with specific input-output examples to more precisely express their intent for how the desired program should behave.

In this regard, a question that arises is how the examples can be leveraged to improve the results produced by a language model such as a PTM. Although the PTM's candidate programs often do not contain precisely the correct program, the programs in this set often contain many relevant components (sub-expressions) and use the relevant operators 440, but these are not composed correctly to produce the right program.

The set of candidate programs produced by a PTM can be leveraged by a component-based program synthesis technique, to construct the desired program from a multi-modal task specification. Component-based synthesis (CBS) provides a generic approach for synthesizing a program in a domain-specific programming language (DSL) that satisfies a given formal specification of a task (such as input-output examples).

In its simplest form, CBS is a systematic enumerative search in the space of possible programs defined by the DSL. It begins with a set of components that are well-formed expressions in the DSL, and iteratively constructs larger programs by combining these components using the operators 440 of the DSL, until a program that satisfies the specification is found. However, in practice, the challenges for any CBS technique include how to handle the state space explosion due to the exponential growth of the set of possible programs, as well as the challenge of ranking among many possible synthesized programs that may satisfy the given specification.

Some embodiment herein help address these challenges by introducing a generic approach to multi-modal program inference that is based on a marriage of pre-trained natural language models and component-based program synthesis. One approach herein combines the benefits of the two techniques by leveraging the output of a PTM to guide three phases of the CBS search: the initialization of components, the iterative synthesis of larger programs, and the ranking 514 of final candidate programs. In this way, the combination of the two approaches serves to address the shortcomings of each: the CBS synthesis improves precision by constructing a program that satisfies the examples (which may otherwise not appear in any of the PTM outputs), while the PTM output tames the complexity of the CBS search space by guiding the search at every stage.

A notable characteristic of this approach is its generality that comes from being domain-agnostic: it is not designed for any particular domain-specific language and is applicable to different programming domains. Many examples herein focus on the language of regular expressions 438 to help illustrate benefits of this approach. Some examples illustrate the generality of this approach by presenting a concrete instantiation and evaluation in the different domain 410 of CSS selectors 404, which is a DSL 324 used in web programming.

Consider a scenario where a user needs help writing a regular expression. FIG. 7 shows three such tasks, with natural language descriptions of regular expressions, the intended ground truth program, and a sample of the pre-trained model's top-ranked 514 candidates 218 for the task. The first column shows the natural language (NL) description the user provides, and the second column shows the ground truth the user desires. The first two tasks are from a Kushman and Barzilay dataset and the third one is from a Stack Overflow question.

A first step consistent with approaches taught herein is to use a PTM to generate candidate regular expressions from the NL description. One suitable PTM is Open AI's GPT-3 system, which is a pre-trained model capable of performing some code generation from natural language.

To get a PTM to produce regular expressions, the approach provides the PTM with a suitable query, which is also called a "prompt". Some embodiments exploit the few-shot learning capabilities of PTM and provide an optimized prompt using a dynamic prompt generation algorithm discussed herein.

PTMs internally generate a probability distribution on possible completions, and then they sample from this distribution to generate individual candidates. Some embodiments exploit this fact to configure the PTM to generate a diverse sample. The third column in FIG. 7 shows some sample candidates returned by the PTM. In all three cases, the results of the PTM in general look very similar to the ground truth, but none of them are exactly equivalent to it. This can be expected given the significant ambiguity in the NL descriptions which is difficult even for a human to resolve. For instance, for task I it is not clear if the intent is that any of "!", capital or lower-case can occur before the character, or if only the lower-case is permitted to occur before a character and the other two should occur alone on the line (the ground truth shows that the intent is the latter). It is also not clear if "before a character" should mean immediately before a single character or not. Similar ambiguities can be seen in the other two tasks, e.g., whether "at least 7" refers to just "!" or not in task II, whether "at least zero times" refers to everything before it in task III and whether "followed by" means immediately followed by or not.

Such ambiguities are common in natural language, and one way to resolve them is by allowing the user to provide concrete examples of the desired behavior 206, such as examples of strings the intended regex should or should not match. Given such examples in addition to the NL, the challenge is how to generate the correct program. A second step consistent with approaches taught herein addresses this challenge using a component-based synthesis (CBS) technique, which is designed to utilize the candidates provided by the PTM at each of three phases of the search (initialization 506, expansion 508, and ranking 514).

As to initialization, one question for any CBS algorithm is how to obtain the initial set of components to begin the search. In an extreme brute force search, one may initialize with a set of concrete values for every terminal symbol of the DSL grammar (e.g., all possible character values in the regex domain), but this is practically untenable for any non-trivial DSL. Note that the candidate programs provided by the PTM all contain very relevant components that can be used to construct the correct program. For example, case I in FIG. 7 shows frequently occurring relevant components such as "[A-Z]", "[a-z]", "!" and ".*". For case II, apart from important frequent components such as "!" and the number 7, one can observe the prominent occurrence of the large sub-expression "[aAeEiIoOuU]" that represents the notion of a vowel that the PTM has identified. Such an expression using many occurrences of the class union operator would require prohibitively many iterations and examples to construct if starting from purely atomic components.

This leads to the question of how a system can infer these most prominent sub-expressions from the PTM outputs, which some embodiments address using 602 inferred maximal components. Intuitively, these are the largest sub-expressions that occur in the PTM candidates with high frequency. Starting from such inferred maximal components can help to effectively construct the correct program, as compared to a component-based approach that starts from all atomic components.

As to expansion, after creating the initial set of inferred components, the CBS approach proceeds by iteratively creating larger programs. At each iteration, this is done by applying the DSL operators 440 to the existing programs to create larger programs. The brute force approach would be to exhaustively apply every operator on every combination of components as permitted by the type system of the DSL, but this leads to a combinatorial blowup in practice. A more tractable option is to employ a beam search approach where only a bounded number of new programs are kept at every synthesis iteration, which raises the question of what criteria to use for determining which programs should be kept or disregarded. Some embodiments address this question using the PTM candidates, by observing the frequency distribution of operators that is found in these programs and biasing the beam search with respect to this distribution.

For instance, for case I in FIG. 7 operators 440 such as alternation (I) and iteration (*) are used about once or twice on average across all candidate programs, while other operators such as quantifiers or character class negation are not used at all. This signals a preference for programs that follow a similar operator distribution pattern as opposed, e.g., to programs that may use five alternations. Some embodiments compute 618 an operator frequency distribution vector from the set of PTM candidates, and at each iteration of the beam search 422 maintain a bounded set of new programs that most closely follow this distribution. In addition, unlike standard beam search methods, some embodiments maintain semantic variety in the beam exploration by ranking 514 within semantic equivalence classes 326 of programs rather than employ a global ranking in the search space. Such condensing 616 of the set of programs within equivalence classes 326 minimizes redundant syntactic variations of the same program in the search exploration, where "same" programs are equivalent at least up to the given examples.

As to ranking, an eventual goal of the CBS algorithm is to return a synthesized program to the user that satisfies the examples. But after a certain number of iterations of CBS in practice, there can be a large number of programs that satisfy the given examples. This raises the question of how to rank among these programs. This decision can be guided in some embodiments by considering similarity of the synthesized programs to the PTM candidates. The operator frequency distribution 442 as used above is a good signal for guiding the search in terms of which operator applications to explore, and is also a good indicator for the final preference of which program to pick from the set of synthesized programs.

However, for final ranking some embodiments use additional stronger signals such as direct string similarity 454 of programs to the PTM candidates. A combination of these signals more finely distinguishes between the final set of synthesized programs in terms of how different operators are being used in the program.

Accordingly, one of skill informed by the teachings herein will acknowledge various advantageous aspects, include for example the following. Some embodiments utilize a domain-agnostic formulation of a multi-modal program inference algorithm that can synthesize programs in an arbitrary DSL when given a natural language description and examples of an intended task. Some uses a CBS synthesis technique that utilizes the output of a PTM on the given NL description to generate a program that satisfies the given examples. Some approaches taught herein provide a form of completeness with respect to the PTM output. Some embodiments apply teachings in a concrete instantiation for the domain of regular expressions. Some embodiments apply teachings in a concrete instantiation for the domain of CSS selectors for extracting elements from web pages. These are merely examples of suitable domains, and teachings herein may also be applied beneficially in other practical programming domains. Some embodiments optimize the prompt provided to pre-trained models such as GPT-3, thereby increasing the quality of query results.

More About Domain Specific Languages

Some embodiments utilize a multi-modal program synthesis algorithm which is not designed for a particular programming domain and is parameterized by an arbitrary domain-specific language (DSL) and its execution semantics. This portion of the present disclosure provides a formal definition of DSLs. It also illustrates DSLs by through a language of regular expressions and a language of CSS selectors.

FIG. 8 shows a definition of a DSL.

FIG. 9(a) shows a DSL Lreg of regular expressions, and FIG. 9(b) shows the parsed tree of [0-9]+:?[0-9]*

As a concrete example, consider FIG. 9(a) which presents Lreg, the DSL of regular expressions. This DSL contains four sorts, Sort :={i, c, s, e}, which respectively represent integers, characters, character sets, and expression sorts. Terms of sort e are closed. The set of constants Const includes all non-negative integers (with sort i) and all characters (with sort c). There are also ten operators in the set Oper of operators, whose signatures are shown in FIG. 9(a). For instance, quant is an operator with ψarg (quant)=(e, i, i> and ψret (quant)=e. This DSL encodes a large set of regular expressions that developers commonly write; for example, FIG. 9(b) presents the parsed syntax tree of the ground truth expression in FIG. 7 (#III).

FIG. 10 shows a definition of "sub-term" and "atomic term". For example, from CharSet(range(0, 9)) is a sub-term of the expression shown in FIG. 9(b), and terms 0 and 9 are atomic.

FIG. 11 shows a formulation of a general notion of semantics for terms.

In a similar fashion, the operator quant(e, i, j) only accepts strings 452 composed of k sub-strings (for any i≥k≥j) each of which is accepted by e, and operator quantMin(e, i) is semantically equivalent to quant(e, i, ∞). Operator alter(e1, e2) accepts strings accepted by either e1 or e2 and operator concat(e1, e2) only accepts strings of the form str1, str2 if e1 accepts str1 and e2 accepts tr2. Operator fromCharSet does not impose any restriction on the accepted strings and simply lifts the terms from sort s to the closed sort e.

For example, the closed term fromCharSet(range(0, 9)) accepts any string 452 composed of a single digit and the term presented in FIG. 9(b) accepts all the following four: 1991:10, 99999, 0:1 and 000:.

As a second target, consider the domain of Cascading Style Sheets (CSS) 402 selectors. FIG. 12 shows Lcss, the DSL for CSS selectors. CSS selectors are expressions for selecting elements from the document object model (DOM) of a webpage. They select nodes based on structural properties that are defined by the HTML source markup of the webpage. For instance, the CSS selector AttributeEquals (TagEquals(AnyQ, "div"), "class", "row"), call it css1, selects all nodes with tag "div" and class "row", which is typically written as div.row. Similarly, the CSS selector Children(css1, AttributeEquals(Any( ), "id", "myid")) picks all nodes that have id "myid" that are immediate child of any node with tag "div" and class "row", which is typically written as div.row>#myid, and the CSS selector Attribute-Equals(nthChild(TagEquals(Any( ), "li"), MultipleOffset(2, 0)), "hidden", "true") represents all nodes with tag "li" whose attribute "hidden" is set to "true" and that occurs at even positions in the sibling list, which is typically written as li:nth-child(2n) [hidden="true"].

A formal semantics of this CSS selector DSL is provided in FIG. 13.

CSS selectors are sometimes used when scraping data from web, or when doing web programming in general. They can be hard to write manually, especially for an occasional user, but they are often easy to describe in natural language.

Having defined the syntax and the semantics of domain specific languages and in particular the DSL of regular expressions and CSS selectors, the next section will formally introduce multi-modal synthesis tasks and describe in detail a generic CBS solution for those tasks. "Generic" here means generally applicable, e.g., domain-agnostic.

A Multi-Modal Program Synthesis Algorithm

This section presents a multi-modal program synthesis algorithm that synthesizes a program to accomplish a task specified in terms of natural language and examples. The algorithm is domain-agnostic 406 and is parameterized by a DSL. FIG. 14 shows definitions of a multi-modal synthesis task, a related example, and a synthesizer goal program. An algorithm NLX for multi-modal synthesis from natural language and examples is illustrated in FIG. 15, parameterized on a DSL L and PTM M. The main top-level function synthesize shown in FIG. 15(a) returns a program synthesized from a multi-modal task specification. As the algorithm is domain-agnostic 406, this function is parameterized by a DSL L and a PTM M for this domain. A later section describes the details of the particular PTM model used and how it is configured with few-shot learning for a particular domain, while this section assumes that such a model M is given.

First consider a high-level structure view of the NLX algorithm, before turning to the constituent phases in more detail. The algorithm proceeds by obtaining the top-ranked programs from the PTM for the given natural language query. It then implements a component-based synthesis (CBS) that utilizes the PTM output to guide the CBS search at each of three phases: the initialization of components, the iterative expansion to larger programs, and the final ranking of programs.

The synthesize function implements this high-level structure of the algorithm. It initially executes the PTM on the given description N and stores the resulting programs in P (line 3), which is used in each of the subsequent phases. The algorithm uses a cache object C 312 to maintain the set of synthesized programs according to their sort in the DSL. A cache, denoted by C: Sort→L, is defined as a map from sorts to sets of terms in L. The cache is initialized by extracting components from the PTM candidates P. This initialization phase is defined by the function initialize (line 4). Next, the embodiment enters the expansion phase in the main loop of the algorithm at line 5. At each iteration, the cache is updated with new programs synthesized by applying operators of L on existing components in the cache. As exploring all possible operator and component combinations is intractable in practice, this embodiment employs a beam search where such combination choices 424 are guided by the PTM candidates P. This is defined by an expand function described below. This process is repeated up to a tunable constant SynthDepth. Finally, the algorithm identifies 624 closed programs in the cache which are consistent with the given examples (line 7) and then performs a ranking to choose the best program to return out of many possible ones. This ranking is based on similarity to the PTM candidates P as defined by a rank function discussed below.

As to initialization of components, a first step in the algorithm is to obtain the set of initial components from which to begin the search. As discussed, the set of top candidate programs P provided by the PTM contains very relevant components for constructing the correct program, but initializing with a very large set of components can lead to the search complexity becoming intractable. Hence one may approach this question with respect to two aspects: how likely a component is to occur in the desired program and how likely is it that a component is redundant in the initial component set (in the sense that it can already be included as part of another larger component). Both of these questions are addressed using a probabilistic formulation with respect to the distribution of components in the PTM candidates.

The initialize function in FIG. 15(b) takes as input the set of PTM candidate programs and returns an initialized cache. This function initially extracts the set of all sub-terms of all programs in P and stores it in a variable v1 (line 2).

As to component occurrence 444, at line 3 an embodiment computes the probability of occurrence of each component to keep those above a tunable minimum probability threshold defined by a constant PrOcc. The occurrence probability 448 for a term t is computed as cnt(t, P)/IP which is the proportion of programs in P that contain the component t. For example, in FIG. 7 (#II), if one considers the set P to be the 8 candidate PTM programs, and the term t=quantMin (fromCharSet(anyQ), 0) (printed as .*) appears in five of the programs in P, then the occurrence probability of t is given by cnt(t, P)/IP I=5/8=0.625.

The occurrence probability check helps ensure that terms which appear more often in the PTM's output have a higher chance of being included in the initial cache, as often there is noise in the PTM output that includes irrelevant components that occur very infrequently. For example, in FIG. 7 (#II), the term printed as vowel, which is clearly due to PTM's confusion about the task, only appears once in the candidate programs. Such terms can be easily eliminated from the initial cache by setting the occurrence probability threshold PrOcc appropriately. In practice, a value of PrOcc=0.1 worked well in the evaluations (with usually at least 20 PTM candidates in total).

As to component redundancy, a second aspect to consider in the initialization of components is that of redundant components. While many components may occur_frequently, many of these may not be useful to include in the initial cache as they may already occur as sub-components of other components. With respect to PTM candidates, if the embodiment finds that a component t always appears as a sub-component of another component t' in all of the PTM candidate programs, then that is a strong signal that t is a redundant component as it can already be included as part of t' in the cache. For example, in FIG. 7 (#II), the term t1=fromChar(a) always appears as a sub-component of the same term t2 that unions all vowels (printed as [aAeEiIoOuU]).

Similarly all terms representing subsets of vowel characters always occur only as sub-components of t2 and can be considered redundant to include by themselves. The term t2 however, occurs as part of many different components and is to be included as a component by itself. In the same example, the term t3 : =fromCharSet(fromChar(!)) (printed as !) appears in multiple different super-terms, e.g. in t4 : = quantMin(t3, 0) (printed as !*), t5 : =quantMin(t3, 1) (printed as !+) and t6 : =concat(t3, t3) (printed as !!). Note the inclusion of both t2 and t3 in the initial cache to construct the ground truth program in this case, since none of t4, t5 or t6 directly appear in the ground truth, i.e. (!|[aAeEiIoOuU]) {7,}.

Formally, at lines 6-9 in the algorithm, this embodiment computes the probability 450 of redundancy 446 of a component t as the proportion of super-components of t that occur as many times as t in the PTM candidates (note that by definition no super-component can occur more times than any of its sub-components). If the redundancy probability is below a certain maximum threshold given by PrRed, then the component is included in the initialization.

Though in general the algorithm permits the redundancy threshold PrRed as a tunable constant, note that the extreme case of PrRed=0 identifies a special case of maximal components 430 that work well in practice. These are components that occur more frequently 432 than any of their supercomponents, and hence represent the PTM's identification of a component that it uses in different ways across different candidate programs, such as the vowel component in FIG. 7 (#II). This suggests the PTM's high confidence that the component is useful but lower confidence on how it should be used in the final program, and hence makes it a good candidate to include in the CBS search which explores many more combinations for synthesis.

Note that this notion of maximality is not just with respect to size 434 but both size and frequency 432. Hence components t and t' may both be maximal even if t⊑t', if t occurs more frequently than t'. Both may be useful to consider as the PTM candidates indicate that t may be used in other ways outside of t'.

The algorithm permits a fixed set of default components for the DSL that should always be included (line 10). These may be any terminal or commonly-used special values for the different sorts in the language. For instance, for the regex domain one includes the default components that are the integer values 0, 1 and the specially named character classes \d, \s, \w, representing digits, space, and word characters. For the CSS domain, include the any-element selector Any( ), the integer value 1 and the empty string attribute value.

This section describes the expansion phase of the algorithm, where larger programs are iteratively constructed using the initial components and already synthesized programs. The brute force approach would be to exhaustively apply every operator on every combination of components as permitted by the rules of the DSL, but this leads to intractable complexity in practice. Hence the technique used is to employ a form of beam search where only a bounded number of new programs are kept 604 at every iteration. This beam search is defined by the technique of pruning the cache which determines which synthesized programs to keep and which to discard. In some embodiments, this technique is based primarily on the distribution of operators that is found in the PTM candidates and includes biasing the beam search with respect to this distribution.

The function expand is defined in FIG. 15(*c*), which given a cache C as input returns a new cache expanded with a set of new terms based on existing terms in C. The procedure initially obtains the subset of terms in C to be considered for expansion using a call to the prune function (line 2). The procedure then iterates over all operators op∈Oper and constructs new terms in L by applying op on existing terms in C' according the signature of op. Newly constructed terms are then stored in a variable v1 (line 5). For example, assuming that the following two terms, t6 and t7, are in the pruned cache C', the set of newly constructed terms, v1, will include terms like t8 : =alter(t6, t7)_and t9 :=concat(t6, t7):
t6 : =quantMin(fromCharSet(fromChar(a)), 0) (printed as a*)
t7 : =quantMin(fromCharSet(fromChar(b)), 0) (printed as b*)

Finally, the procedure expand updates the original cache C by adding terms in v1 to C(s), where s is the return sort of current operator op (line 7). Once the loop is iterated over all operators, the procedure returns the updated cache C as its final output (line 8).

A technique of pruning the search space (by pruning the cache) during the beam search is based primarily on the distribution of operators that is found in the PTM candidates and includes biasing the beam search with respect to this distribution in a way that maintains semantic variety of the synthesized programs (e.g., minimizes redundant semantically equivalent expressions in the search space). The pruning function prune is defined in FIG. 15(*d*), which is used in the beginning of each expansion iteration to bound the number of terms considered for expansion.

As to semantically equivalent sub-terms, to avoid semantically redundant states a first pruning strategy is to remove any term that is semantically equivalent to any of its sub-terms (line 4). For instance, assume that the given set of examples is E1:={aa, ccc} and the term t8 defined earlier (alter(t6, t7)) is in v1. Observe that t8 is not semantically distinguishable from its sub-term t6 with respect to E1 (since they both accept aa and reject ccc). Consequently, any possible use-case of t8 in the future iterations can also be handled by t6, and hence, t8 can be eliminated from v1. This observation is formalized by defining the interpretation of a term t with respect to a set of examples E, denoted by $[[t]]E$, as a set of input and output pairs, where the input belongs to an example in E and output is generated by running t on that input: $[[t]]E:=\{<i, [[t]] (i)>|<i,\_>\in E\}$. In the example discussed above, $[[t6]]E1=[[t8]]E1=\{<aa,T>, <ccc,\bot>\}$. The procedure eliminates all terms in v1 which share their interpretation (with respect to the given examples) with some of their sub-terms (line 4). The remaining terms are stored in a fresh variable v2.

As to low frequency operators, a primary signal for pruning is to bias towards the structure of the PTM candidates. A first constraint to consider in this bias is to avoid DSL operators that may occur with a very low frequency (or not at all) across all of the PTM candidates. For example, in FIG. 7 (#III), the alternation operator (alter) does not appear in any of the candidate programs generated by the PTM. This signals that the target program does not have many alternation operators (it has in fact none).

Some embodiments distinguish such low-frequency operators using a tunable constant OpTH that defines the threshold for low-frequency operators: operators that on average have fewer occurrences than this threshold are allowed at most OpTH occurrences. Some embodiments implement this using the function opVec that given a term t returns an integer vector composed of the number of occurrences of each DSL operator in t. For example, for the term t6 defined above, opVec(t6) is a vector that has value 1 in the three entries assigned to quantMin, fromCharSet and fromChar and has value 0 everywhere else.

Using this function, this embodiment eliminates terms whose operator vector is different from programs in P. In particular, the procedure prune eliminates terms from v2 whose Hamming distance from programs in P is bigger than 0 (line 5).

The Hamming distance between a term t and the set of programs P is calculated using the function HammDist, defined in FIG. 15(g). The inputs to the function are a set of programs P to compute the distance from, and a term t. This function first determines the operator vector of t (line 2) and the average operator vector of all programs in P (line 3). The final result is defined as the number of entries in the operator vector of t whose value is greater than OpTH, and the value of the corresponding entry in the average vector of P is less than OpTH.

For example, in FIG. 7 (#III), the value assigned to the alter entry in the average operator vector of programs in P is 0, and hence, if OpTH is set to 1, their Hamming distance from any term that has more than 1 occurrences of alter is at least 1; such terms will not be included in v3.

As to semantic condensation, a final step of pruning is to implement the beam-based cutoff of the state space based on the final ranking of programs with respect to the operator distribution. Unlike some beam search methods, some embodiments do not perform a global ranking on the search space when considering the beam. Instead, they maintain semantic variety in the beam exploration by ranking within semantic equivalence classes of programs. Such condensing of the set of programs within equivalence classes minimizes redundant syntactic variations of the same program in the search exploration which can come from a global ranking. At line 6, the prune function classifies terms in v3 into semantic classes. A semantic class is defined as a set of terms which have equal interpretations with respect to E. All terms in v3 must belong to exactly one semantic class. The set of all semantic classes is stored in variable v4 (line 6).

Next, using a call to function ordEuc (defined in FIG. 15(i)), the procedure orders terms in each semantic class according to their syntactic similarity 454 to the programs in P. The highest ranked programs in each semantic class are then identified and their union is stored in a variable v5 (line 8).

The number of terms selected from each class is determined by the size of that class and a tunable constant BeamSize (line 7). For example, assuming BeamSize is set to 2000 and there are 5000 terms in v3, the top 400 terms from a semantic class of size 1000 will be selected to be in the pruned cache.

Finally, once the iteration over all sorts is finished, the procedure returns the fully pruned cache as the final result (line 10).

Now consider ranking of the synthesized programs. A goal of the CBS algorithm is to eventually return a synthesized program to the user that satisfies the examples. But after a certain number of iterations of CBS in practice, there can be a large number of programs that satisfy the given examples. As in other phases, in some embodiments a technique for ranking is also guided by considering similarity of the synthesized programs to the PTM candidates.

The operator frequency distribution as used above is a good signal for guiding the search in terms of which operator applications to explore, and is also a good indicator for the final preference of which program to pick from the set of synthesized programs. However, for final ranking it is helpful to use the additional stronger signal of direct string similarity 454 of programs to the PTM candidates.

The function rank is defined in FIG. 15(e). This function is called in the main function synthesize (line 8). Given a set T of terms and a set P of programs generated by the PTM, this function returns an ordered list of terms in T according to their syntactic similarity to the programs in P. In particular, terms in T are lexicographically ordered 622 based on two different measures of distance from programs in P. The first measure is the standard Euclidean distance between the operator vector of terms in T and the average operator vector of programs in P (line 2). This helps ensure that the final synthesized program is structurally as close as possible to the PTM's candidate programs.

In order to distinguish terms in T with the same Euclidean distance to P, the procedure next applies the Levenshtein distance as a more fine-grained measure of distance between (the string representation of) terms. The Levenshtein distance 454 between two strings is defined as the minimum number of single character modifications required to transform one string into another.

As to completeness, the NLX algorithm implements a component-based synthesis that is guided by the output of the PTM at every stage. One may empirically evaluate the effectiveness of these techniques in practice. One may also consider what theoretical guarantees can be provided on completeness: can the algorithm eventually find a program if one exists? Completeness depends on the ability of the underlying language model, the PTM, to find relevant programs that match the intended task. Hence, one may consider a relative completeness result with respect to the PTM output.

However, an understanding of the details of a relative completeness proof is not required to adequately describe the NLX algorithm or to permit implementation of embodiments. Accordingly, it suffices to note here that if a correct intended program exists in a space Pc which includes all programs that can be constructed from atomic components of the closure of candidate programs P with respect to a DSL L, then the NLX algorithm can find a semantically equivalent program of the correct intended program when given sufficient examples, assuming a condition of compositionality holds for the DSL. This relative completeness result follows from the fact that the NLX algorithm reduces to an exhaustive enumerative search under the extreme parameter settings above.

Optimizing Use of the PTM

Discussion above describes a generic component-based synthesis technique that uses the top candidate results of a PTM to seed and guide an enumerative search. The effectiveness of this process, however, may depend on the quality of the initial results received from the PTM. Getting helpful results from the PTM may be heavily dependent on asking the questions in a suitable way.

In particular, using the PTM effectively may involve three distinct steps. First, the task at hand is encoded into a prompt that acts as the context for the PTM. Then, the prompt is provided as input to the PTM which then produces a completion. Finally, the candidate program from the output completion is extracted.

Some embodiments use the PTM as a few-shot learner, in that the model is provided a few question-answer pairs that act as examples of the task at hand. Note that some embodiment discussions may use the term question-answer pair (instead of example) to avoid confusion with the examples used for the synthesis tasks given to NLX algorithm.

For instance, FIG. 16(a) shows a prompt that is used as context for the PTM. The prompt has three parts: (i) a high level description of the task domain (lines 1-3), (ii) a sequence of sample question-answer pairs (lines 5-15), and (iii) the question of interest (line 17).

Structuring the prompt in this way has multiple advantages. First, the question-answer pairs often contain components that increase the probability of the PTM returning results using those components, e.g., vowel is used in a question-answer pair (line 5) which is also part of the final question. Additionally, the structured prompt biases the PTM to produce a response in the same format, making the task of extracting the resulting program as simple as picking the right stop sequence (here, NL:).

For example, FIG. 16(b) presents one of the completions 614 that GPT-3 produces given the prompt 408 in FIG. 16(a). The completion includes a candidate program for the task (line 18) and a few additional lines, following the same pattern from the prompt (lines 19-21). It is easy to see how the candidate program can be extracted from the completion using the stop sequences.

Although in this example the PTM was able to successfully generate the intended program, that is not always the case. For example, if one removes the first two question-answer pairs from the prompt (lines 5-10), the completion produced by GPT-3 does not solve the task correctly and returns programs like [A-Z]{3}[0-9]{4}.*, which does not even include the correct components of the intended program.

Some PTMs restrict the size of the input prompt they accept. For example, the GPT-3 prompt is restricted to 2048 tokens (small units that are meaningful and occur more generally than specific text). Given this limited prompt size, the set of question-answer pairs to act as examples for k-shot learning may influence the quality of results. Some embodiments use a technique taught herein for choosing suitable question-answer pairs, and consider multiple variations to determine optimal parameters for prompt generation.

Algorithm QAPR (Question-Answer Pair Ranking) shown in FIG. 17 depicts a question-answer pair selection technique utilized in some embodiments. The primary inputs are (1) a corpus of question answer pairs, QA=(q0, a0), (q1, a1), ... (qn, an), where each question qi is a natural language description and the answer ai is the corresponding program, and (2) a question q* that represents the task in hand. The procedure returns a sequence RelevantQA=(qi0, ai0), ..., (qik, aik) of k question-answer pairs to be used in the prompt. The QAPR algorithm is parameterized by a relevance metric R 420 on questions. A greater R(q, q') score indicates that question q (and its answer) is more relevant to (answering) q'. At a high level, Algorithm QAPR orders the available question-answer pairs in QA based on their relevance 418 to q* and identifies the highest ranked question-answer pair (line 3).

The chosen pair (qm, am) is added to the result sequence if am is not closer than a specified distance to an already selected answer in RelevantQA (line 5). One may define closeness of answers as the Levenshtein distance between them, which is a fine-grained measure of distance between strings at the level of characters. If the distance is less than a threshold t then the answers are considered too close and the question-answer pair is discarded. This helps ensure that the PTM is not biased toward a particular group of tasks and does not produce sub-optimal results. Relevance metrics are illustrated in FIG. 18. As to TF-IDF, the measure RTM treats all tokens 458 identically because it only counts the tokens. However, rare 460 tokens are better indicators of relevance. Some embodiments follow a term-frequency inverse document frequency (TF-IDF) technique to increase weight of rare tokens. In particular, one may define the TF-IDF score 462 of each token and weight them based on this score, as noted in FIG. 18.

Some experimentation showed some impact of the similarity check in Algorithm QAPR (line 5) on the recall of the PTM for different relevance metrics. Some embodiments use GPT-3 as a PTM with the temperature parameter set to 0.6. In GPT-3 terminology, temperature 0.0 represents an entirely deterministic value, whereas 1.0 represents output that is fully stochastic. In the domain of regular expression, some experimentation aimed to allow the PTM sufficient randomness to generate a varied candidate set, but not an entirely random one such that the similar components between candidates carried represented some value of confidence. After some brief initial trials, 0.6 was selected for temperature and 10 selected as the threshold on the number of question-answer pairs in the prompt.

An experimentation corpus contained 4855 question-answer pairs from a Locascio dataset and test tasks consisted of 115 questions from the same dataset. For each variant of Algorithm QAPR, experimentation generated a prompt based on the relevant_pairs returned by the variant and measured the recall in top 20 completions, to determine in what fraction of the cases the correct answer is in the top 20 completions produced by the PTM. For the baseline, experimentation used a straw-man procedure that randomly chooses question-answer pairs from the corpus. First, experimentation fixed the threshold k on the size of the result to be 10, and test variants using token match and TF-IDF metrics and with and without the Levenshtein distance based similarity check.

The results highlight two points. First, intelligent relevance-based selection of question-answer pairs for the in-context k-shot learning makes a significant difference to the recall of the PTM. Second, using the Levenshtein distance based similarity check increases the diversity in the question-answer pairs used in the prompt, and thereby increases the recall of the PTM. Additional details about this experimentation are available in Kia Rahmani, et al., "Multi-modal Program Inference: A Marriage of Pre-trained Language Models and Component-based Synthesis", a copy of which will be in Information Disclosure Statement documents submitted with the present patent disclosure.

CSS (Cascading Style Sheets) selectors provide examples for teachings herein, which thus extend beyond the domain of regular expressions. A notable characteristic of some approaches taught herein is that they are domain-agnostic. The techniques are not designed specifically for the language of regular expressions and can be applicable to other DSLs, in some embodiments even to arbitrary DSLs.

CSS selectors are defined, e.g., per W3C 2020 specifications or other consistent specifications. CSS selectors are expressions for selecting elements from the document object model (DOM) of a webpage, based on structural properties that are defined by the HTML source markup of the webpage. Some embodiments use the language of CSS selectors shown in FIG. 12. Some examples of questions about CSS selectors are shown in FIG. 19.

Experimentation with an embodiment tailored for CSS confirmed benefits of applying teachings herein in obtaining relevant components from PTM candidates and guiding a search base on similarity to these obtained programs, e.g., reduction in the number of examples needed to obtain a solution program. Additional details about this experimentation are available in Kia Rahmani, et al., "Multi-modal Program Inference: A Marriage of Pre-trained Language Models and Component-based Synthesis", a copy of which will be in Information Disclosure Statement documents submitted with the present patent disclosure.

Regardless of the specific domain, utilizing a CBS synthesis algorithm that is guided by the PTM output as taught herein to generate a program that satisfies the examples provides better performance in many cases than other multimodal programming approaches or use of the PTM alone, by virtue of lowering the number of examples required to reach a solution program. For instance, some embodiments take both NL and examples to find the intended solution program with much fewer interactions than other approaches.

Furthermore, while some other approaches are designed specifically for the regular expression domain, teachings herein provide an approach which is domain-agnostic and applicable to other programming domains, e.g., CSS selectors.

NLX is a general approach for multimodal synthesis that combines the strengths of PTMs and program synthesis in particular ways discussed herein. NLX effectiveness leverages consequences of the underlying hypotheses that (A) the multiple candidates returned by PTMs contain the components of the ground truth, even though they may not contain the whole ground truth, (B) the candidates reveal (approximately) the distribution/frequency of the operators in the ground truth, (C) users can provide input-output examples to refine their intent in case the synthesis engine does not return their desired program, and (D) subprograms (subterms) can be executed on inputs (obtained from the examples) to determine (approximate) semantic equivalence of these subprograms. (A) and (B) hold in general. There exist domains where assumptions (C) and particularly (D) are not easily satisfied, but even in those cases, the NLX approach can be adapted by replacing the steps that rely on examples by alternate steps that rely on other forms of intent specification.

As another example, consider the domain of Python's data processing library Pandas. Pandas is employed by data scientists for writing scripts that can be used to ingest data, clean data, reshape and manipulate data, and visualize data. Pandas is a suitable target for generating code from NL descriptions in that (a) it is widely used, including by non-programmers, and (b) it has a very large API, and it is very difficult to remember the API details, especially for an occasional user. FIG. 20 shows some Pandas examples, including an NL description of a task, an associated ground truth, and a few of the candidates generated by the PTM model. A difficulty in using NLX for synthesizing Pandas code is that assumptions (C) and (D) are harder to satisfy. In such cases, one may adapt the approach and extend it with other methods, such as the use of types to suggest repairs. One can also extend NLX by generalizing the notion of components to also include sketches, or terms with holes. Steps in the NLX algorithm will generalize to using sketches as components, except for steps that require assumption (D).

Technical Character

The technical character of embodiments described herein will be apparent to one of ordinary skill in the art, and will also be apparent in several ways to a wide range of attentive readers. Some embodiments address technical activities such as automated generation 502 of software programs 218, 204, program synthesis 512, beam search 422, string 452 comparison, distribution 422 computations, component extraction 508 from candidate programs 218, and relevance metric 420 computation, which are each an activity deeply rooted in computing technology. Some of the technical mechanisms discussed include, e.g., language models 214, synthesizers 216, caches 312, equivalence classes 326, and domain specific languages 324. Some of the technical effects discussed include, e.g., search space reduction, synthesis iteration count reduction, and automatic generation of programs 204 which match an informal, ambiguous, or incomplete description. Thus, purely mental processes and activities limited to pen-and-paper are clearly excluded. Other advantages based on the technical characteristics of the teachings will also be apparent to one of skill from the description provided.

Some embodiments described herein may be viewed by some people in a broader context. For instance, concepts such as ease, efficiency, or user satisfaction may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to automatically and effectively infer solution programs from natural language descriptions. Other configured storage media, systems, and processes involving ease, efficiency, or user satisfaction are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples, operating environments, domain specific language examples, solution description examples, software processes, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
GUID: globally unique identifier
IaaS or IAAS: infrastructure-as-a-service
ID: identification or identity
LAN: local area network
OS: operating system
PaaS or PAAS: platform-as-a-service
RAM: random access memory
ROM: read only memory
TPU: tensor processing unit
UEFI: Unified Extensible Firmware Interface
UML: Unified Modeling Language
XML: eXtensible Markup Language
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process").

"Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Multi-modal program inference operations such as extracting components, calculating distributions, synthesizing programs, and many other operations discussed herein, are understood to be inherently digital. A human mind cannot interface directly with a CPU or other processor, or with RAM or other digital storage, to read and write the necessary data to perform the multi-modal program inference steps taught herein. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as calculating, checking, classifying, choosing, computing, condensing, constructing, designating, eliminating, executing, extracting, filtering, identifying, inferring, leveraging, listing, obtaining, preparing, querying, ranking, receiving, recommending, repairing, retaining, selecting, submitting, synthesizing, utilizing (and calculates, calculated, checks, checked, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment

102 computer system, also referred to as a "computational system" or "computing system", and when in a network may be referred to as a "node"

104 users, e.g., user of an enhanced system 202

106 peripherals

108 network generally, including, e.g., LANs, WANs, software-defined networks, clouds, and other wired or wireless networks 110 processor
112 computer-readable storage medium, e.g., RAM, hard disks
114 removable configured computer-readable storage medium
116 instructions executable with processor; may be on removable storage media or in other memory (volatile or nonvolatile or both)
118 data
120 kernel(s), e.g., operating system(s), BIOS, UEFI, device drivers
122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, and so on
124 applications, e.g., word processors, web browsers, spreadsheets, games, email tools, commands
126 display screens, also referred to as "displays"
128 computing hardware not otherwise associated with a reference number 106, 108, 110, 112, 114
130 file, blob, table, container, or other digital storage unit(s)
132 digital document, e.g., word processor document, spreadsheet document, source code document, or other document in digital (computer-readable and software-editable) format; may include text, graphics, sound, etc.; may be stored in one or more files 130
134 cloud
202 system 102 enhanced with multi-modal program inference functionality 210
204 solution program; may also be referred to as "target" program
206 behavior of solution program when executed in a system 102
208 description of solution program; digital
210 multi-modal program inference functionality, e.g., functionality which performs at least steps 506-516, or an implementation providing functionality for any previously unknown method or previously unknown data structure shown in any Figure of the present disclosure
212 user interface; includes software
214 language model; also referred to as "pre-trained model" or "natural language model"; includes software; GPT-3 is one example
216 transform synthesizer; may use Microsoft PROSE™ technology or another program synthesis technology (mark of Microsoft Corporation), for example
218 candidate program; digital
302 multi-modal, e.g., mixing a program synthesizer with a pre-trained model
304 program component; digital
306 multi-modal program inference software, e.g., software which performs any method according to any of the Figures herein or utilizes any data structure according to any of the Figures herein in a manner that facilitates automatic proactive generation of a solution program from a solution description
308 interface generally to a system 102 or portion thereof; may include, e.g., shells, graphical or other user interfaces, network addresses, APIs, network interface cards, ports
310 source code; digital
312 cache; system 102 subsystem
314 prose; another term for "natural language" as opposed to a computer programming language, for example
316 partial listing of a computer program source code; digital
318 input portion of an input-output pair
320 output portion of an input-output pair
322 input-output pair; digital
324 domain specific language; digital
326 semantic equivalence class; defined computationally in a system 102
402 cascading style sheet; digital
404 cascading style sheet selector; digital
406 domain agnostic; a characteristic of a software 306 or a system 202, per which the software or system functions for multiple domains 410
408 prompt or query to a language model; digital
410 domain of a domain specific language; some examples include regular expressions, CSS selectors, and other particular computing task domains; some other examples include the respective domains of text transformation utilities sed and gawk, SQL (structured query language) domain, HTML domain, XML domain, UML domain, and so on
412 domain description in a prompt 408
414 question-answer pair in a prompt 408
416 non-paired question in a prompt 408
418 relevance as measured by a relevance metric
420 relevance metric; computational
422 beam search; computational
424 result of beam search; digital
426 script; digital
428 iteration during program synthesis
430 maximal component; digital
432 frequency of a maximal component; digital
434 size of a maximal component; digital
436 syntactic validity of a maximal component; digital
438 regular expression, sometimes called "regex"; digital
440 operator in a program, e.g., arithmetic operator, logical operator, set operator, or other computational operator
442 frequency distribution of an operator
444 occurrence of a program 218 or component 304
446 redundancy of a program 218 or component 304
448 probability of occurrence 444; digital
450 probability of redundancy 446; digital
452 string; digital
454 string similarity; computational
456 closed program 218
458 token; digital
460 rareness of token 458; digital
462 score representing rareness 460; digital
464 sketch; digital
466 template; digital
500 flowchart; 500 also refers to multi-modal program inference methods illustrated by or consistent with the FIG. 5 flowchart
502 infer a program source code using a computational multi-modal program inference tool or technique taught herein
504 computationally receive a solution program description 208, e.g., via a user interface 212

506 computationally obtain one or more initial candidate programs 218 from a language model 214, e.g., as part of a query response 508 computationally infer one or more program components 304, e.g., using lexical analysis, parsing, data extraction, or other tools or techniques consistent with the teachings herein 510 iteratively computationally construct one or more programs 218 using program synthesis 512

512 computationally synthesize one or more programs, e.g., using component-based synthesis, a synthesizer 216, the algorithm in FIG. 15, or variations thereof, for example 514 computationally rank candidate programs 218

516 computationally designate a program 218 as a solution program 204, e.g., by separating it from other candidate programs for presentation to a user as a solution that is based on a particular solution description 208

518 by computational activity, leverage a solution program 204

520 computationally execute a program, as opposed for instance to computationally merely storing or displaying a source code of the program 522 computationally recommend a program, e.g., by displaying a source code of the program with an indication that it is a solution 204

524 computationally list a program, e.g., by printing or otherwise displaying at least part of a source code of the program and making the rest available for display on request 600 flowchart; 600 also refers to multi-modal program inference methods illustrated by or consistent with the FIG. 6 flowchart (which incorporates the steps of FIG. 5)

602 computationally utilize a maximal component 604 computationally retain a candidate program 606 computationally eliminate a candidate program 608 computationally prepare a prompt for later submission to a language model 610 computationally submit a prompt (e.g., query) to a language model 612 computationally extract a program component, e.g., from a language model prompt completion 614 language model prompt completion (e.g., query response)

616 computationally condense programs using equivalence classes 618 compute an operator frequency distribution (as with other calculations and computations, this is performed in and by a computing system 102 not as a mental step by a human)

620 computationally choose a question-answer pair for inclusion in a prompt to a language model 622 calculate a string similarity, e.g., using a string distance metric 624 computationally identify a closed program 218

626 computationally check a program or program component for syntactic validity, e.g., as done by a compiler or an interpreter 628 computationally avoid (e.g., rule out, filter out, exclude) use of a program or program component that lacks syntactic validity 630 computationally select a component for use as a candidate 632 computationally repair a component to provide syntactic validity, e.g., based on an autocompletion suggestion 634 any step discussed in the present disclosure that has not been assigned some other reference numeral

CONCLUSION

In short, the teachings herein provide a variety of multi-modal program inference functionalities 210 which operate in enhanced systems 202. Embodiments use a multi-modal approach 502 to generate software programs 204 that match a solution program description 208. The solution program description 208 may include natural language 314, input-output examples 322, partial source code 316, desired operators 440, or other hints to the desired structure or behavior (or both) of a solution 204. Some embodiments use optimized prompts 408 to a pre-trained language model 214 to obtain 506 initial candidate programs 218. Maximal program components 430 are extracted 612 and then recombined 510 variously using component-based synthesis 512. Beam search 422 reduces a solution program search space by discarding 606 some candidates 218 from a given synthesis iteration 428. Relevance metrics 420, string similarity 454 metrics, operator frequency distributions 442, token rareness scores 462, and other optimizations may be employed.

By virtue of optimizations and the multi-modal approach, a solution program 204 may be obtained after fewer iterations 428 than by use of a language model 214 alone. The multi-modal approach is domain agnostic 406, as illustrated herein by examples using regular expression 438 and cascading style sheet 402 selector 404 domain specific languages 324. Other aspects of multi-modal program inference functionality 210, and its technical advantages, are also described herein. Some advantages will also be apparent to one of skill in view of the teachings herein, even if such advantages are not expressly noted herein.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware in documents. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 5, 6, and 15-17 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific ground truths, candidate programs, operators, program components, formulas, prompts, DSLs, terminologies, notations, thresholds, comparisons, runtimes, languages or architectures, scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system configured for multi-modal program inference, the computing system comprising:
   a digital memory;
   a processor in operable communication with the digital memory, the processor configured to perform multimodal program inference steps including: (a) receiving a solution program description, (b) obtaining a set of initial candidate programs from a language model, the initial candidate programs based on at least a portion of the solution program description, (c) inferring program components from at least a portion of the initial candidate programs, (d) iteratively constructing a set of synthesized candidate programs from at least a portion of the inferred program components, the synthesized candidate programs constructed using at least program synthesis, (e) ranking at least two of the synthesized candidate programs or initial candidate programs or both relative to one another, wherein ranking a particular candidate program comprises calculating a string similarity between the particular candidate program and at least a portion of a particular initial candidate program obtained from the language model, (f) designating a top-ranked candidate program as a solution program, the solution program being consistent with the solution program description, and (g) leveraging the solution program, wherein leveraging includes at least one of: executing the solution program, recommending execution of the solution program by configuring a user interface of the computing system, or listing a source code of the solution program by configuring the user interface.

2. The computing system of claim 1, wherein the solution program description includes at least one of the following:
   a natural language description which is not in any programming language source code;
   an input-output pair containing an input and a desired corresponding output of an execution of the solution program;
   an incomplete listing of a source code of the solution program; or
   an identification of at least one operator for inclusion in the solution program.

3. The computing system of claim 1, further comprising a synthesized programs cache containing at least one of the following: one or more of the obtained program components, or one or more of the constructed candidate programs.

4. The computing system of claim 1, further comprising semantic equivalence classes, each semantic equivalence class containing one or more respective program components, each program component in a given semantic equivalence class producing upon execution a same output in response to an input of an input-output pair of the solution program description.

5. The computing system of claim 1, wherein the solution program is further characterized by containing at least one of the following:
   a regular expression;
   a cascading style sheet selector;
   a data science data processing script; or
   a source code of a synthesized program in a domain specific language of a program synthesizer, the program synthesizer being in the computing system or in operable communication with the computing system.

6. A method for multi-modal program inference, the method performed by a computing system, the method comprising:
   receiving a solution program description;
   obtaining a set of initial candidate programs from a language model, the initial candidate programs based on at least a portion of the solution program description, wherein obtaining the set of program components from the language model comprises preparing a prompt, submitting the prompt to the language model, and extracting a program component from a prompt completion provided by the language model responsive to the prompt;
   inferring program components by extraction from at least a portion of the initial candidate programs;
   iteratively constructing a set of synthesized candidate programs from at least a portion of the inferred program components, the synthesized candidate programs constructed using at least program synthesis;
   ranking at least two of the synthesized candidate programs or initial candidate programs or both relative to one another;
   designating a top-ranked candidate program as a solution program, the solution program being consistent with the solution program description;
   leveraging the solution program, wherein leveraging includes at least one of: executing the solution program, recommending execution of the solution program by configuring a user interface of the computing system, or listing a source code of the solution program by configuring the user interface; and
   wherein the method is further characterized by at least one of: (a) the prompt includes a domain description, a sample question-answer pair, and a question that is not paired in the prompt with any answer, or (b) the prompt includes a sample question-answer pair, and the method further comprises choosing the sample question-answer pair for inclusion in the prompt at least in part by using a relevance metric, the relevance metric being based at least in part on a token rareness score.

7. The method of claim 6, wherein the method is domain-agnostic in that the method is parameterized by at least a domain specific language.

8. The method of claim 6, wherein:
   obtaining the set of program components from the language model comprises preparing the prompt, submitting the prompt to the language model, and extracting the program component from the prompt completion provided by the language model responsive to the prompt, and wherein the prompt includes the domain description, the sample question-answer pair, and the question that is not paired in the prompt with any answer; and
   the solution program is further characterized by containing at least one of the following: a regular expression; a cascading style sheet selector; a data science data processing script or a source code of a synthesized program in a domain specific language of a program synthesizer, the program synthesizer being in the computing system or in operable communication with the computing system.

9. The method of claim 6, further comprising utilizing a maximal component as an initial program component while iteratively constructing the set of candidate programs, the maximal component having a higher frequency of occurrence in the obtained set of program components than at least one other component in the obtained set, the maximal component also having a larger size than at least one other component in the obtained set.

10. The method of claim 6, wherein iteratively constructing the set of candidate programs comprises either retaining or eliminating a given candidate program based on at least a beam search result.

11. The method of claim 6, wherein iteratively constructing the set of candidate programs comprises condensing programs by using semantic equivalence classes.

12. The method of claim 6, wherein at least one of the following occurs:
   iteratively constructing the set of candidate programs comprises either retaining or eliminating a given candidate program based on at least an operator frequency distribution; or
   ranking candidate programs comprises computing an operator frequency distribution.

13. The method of claim 6, wherein ranking candidate programs comprises calculating a string similarity between a candidate program and a program component obtained from the language model.

14. The method of claim 6, further comprising identifying a closed program as a candidate program, wherein the closed program is a program which has a type or a sort that is a start symbol of a domain specific language grammar.

15. The method of claim 6, further comprising selecting a program component for use as a candidate program based on at least one of the following: a probability of occurrence of the program component, or a probability of redundancy of the program component.

16. A computer-readable storage device configured with data and instructions which upon execution by a processor cause a computing system to perform a method for multi-modal program inference, the method comprising:
   receiving a solution program description;
   obtaining a set of initial candidate programs from a language model, the initial candidate programs based on at least a portion of the solution program description;
   inferring program components by extraction from at least a portion of the initial candidate programs;
   iteratively constructing a set of synthesized candidate programs from at least a portion of the inferred program components, the synthesized candidate programs constructed using at least program synthesis;
   ranking at least two of the synthesized candidate programs or initial candidate programs or both relative to one another;
   designating a top-ranked candidate program as a solution program, the solution program being consistent with the solution program description after no more than two iterations of program synthesis candidate program construction; and
   leveraging the solution program, wherein leveraging includes at least one of: executing the solution program, recommending execution of the solution program by configuring a user interface of the computing system, or listing a source code of the solution program by configuring the user interface.

17. The computer-readable storage device of claim 16, wherein obtaining the set of program components from the language model comprises preparing a prompt, submitting the prompt to the language model, and extracting a program component from a prompt completion provided by the language model responsive to the prompt, wherein the prompt includes a sample question-answer pair, and wherein the method further comprises choosing the sample question-answer pair for inclusion in the prompt at least in part by using a relevance metric, the relevance metric being based at least in part on a token rareness score.

18. The computer-readable storage device of claim 16, wherein ranking candidate programs comprises calculating a string similarity between a candidate program and a program component obtained from the language model.

19. The computer-readable storage device of claim 16, wherein a candidate program includes a sketch, the sketch being a component template which matches multiple components.

20. The computer-readable storage device of claim 16, wherein the method further comprises at least one of the following:
   checking an obtained program component for syntactic validity; or
   avoiding use of a syntactically non-valid obtained program component.

* * * * *